(12) United States Patent
Hoki et al.

(10) Patent No.: US 7,676,094 B2
(45) Date of Patent: Mar. 9, 2010

(54) ROAD SURFACE REFLECTION DETECTING APPARATUS

(75) Inventors: Kenta Hoki, Hekinan (JP); Yukimasa Tamatsu, Okazaki (JP); Kenji Kobayashi, Kariya (JP)

(73) Assignee: Denso Corporation, Kariya (JP)

( * ) Notice: Subject to any disclaimer, the term of this patent is extended or adjusted under 35 U.S.C. 154(b) by 1074 days.

(21) Appl. No.: 11/032,893

(22) Filed: Jan. 11, 2005

(65) Prior Publication Data

US 2005/0152581 A1 Jul. 14, 2005

(30) Foreign Application Priority Data

Jan. 14, 2004 (JP) ............... 2004-007338

(51) Int. Cl.
G06K 9/48 (2006.01)
G06K 9/00 (2006.01)
G06K 9/46 (2006.01)
G06K 9/66 (2006.01)

(52) U.S. Cl. ............ 382/199; 382/104; 382/108; 382/195; 382/181; 382/194

(58) Field of Classification Search .............. None
See application file for complete search history.

(56) References Cited

U.S. PATENT DOCUMENTS

| | | | | |
|---|---|---|---|---|
| 4,703,512 A | * | 10/1987 | Saka et al. ............ | 382/199 |
| 5,027,413 A | * | 6/1991 | Barnard ................ | 382/103 |
| 5,091,963 A | * | 2/1992 | Litt et al. .............. | 382/149 |
| 5,301,239 A | * | 4/1994 | Toyama et al. .......... | 382/104 |
| 5,424,952 A | * | 6/1995 | Asayama ............... | 701/200 |
| 5,694,483 A | * | 12/1997 | Onoguchi .............. | 382/154 |
| 5,768,404 A | * | 6/1998 | Morimura et al. ....... | 382/107 |
| 5,774,177 A | * | 6/1998 | Lane .................... | 348/88 |
| 5,835,614 A | * | 11/1998 | Aoyama et al. ......... | 382/104 |
| 5,867,593 A | * | 2/1999 | Fukuda et al. .......... | 382/176 |
| 6,005,492 A | * | 12/1999 | Tamura et al. .......... | 340/937 |
| 6,091,833 A | | 7/2000 | Yasui et al. | |

(Continued)

FOREIGN PATENT DOCUMENTS

JP 2000-180378 6/2000

(Continued)

OTHER PUBLICATIONS

Office action dated Apr. 1, 2008 in Japanese Application No. 2004-007338 with English translation thereof.

(Continued)

*Primary Examiner*—Vikkram Bali
*Assistant Examiner*—Michelle Entezari
(74) *Attorney, Agent, or Firm*—Harness, Dickey & Pierce, PLC

(57) ABSTRACT

A road surface reflection detecting apparatus includes a road recognition unit for recognizing a road in a picture taken by a camera of a road existing in front of a vehicle. A road surface reflection detection unit extracts a picture from the road recognized by the road recognition unit and determines the degree of reflection of light from the surface of the road based on the picture extracted from the road. The picture includes the reflection of light beam radiated from vehicle headlights. If the reflection is determined to be high, the direction or intensity of the light beam from the vehicle headlights is regulated.

37 Claims, 21 Drawing Sheets

U.S. PATENT DOCUMENTS

| | | | |
|---|---|---|---|
| 6,101,274 A * | 8/2000 | Pizano et al. | 382/176 |
| 6,128,088 A * | 10/2000 | Nishiwaki | 356/392 |
| 6,218,960 B1 * | 4/2001 | Ishikawa et al. | 340/901 |
| 6,307,980 B1 * | 10/2001 | Quacchia | 382/268 |
| 6,392,759 B1 * | 5/2002 | Kuwata et al. | 358/1.9 |
| 6,400,848 B1 * | 6/2002 | Gallagher | 382/254 |
| 6,404,461 B1 * | 6/2002 | Le Clerc | 348/700 |
| 6,493,458 B2 * | 12/2002 | Yasui et al. | 382/104 |
| 6,590,521 B1 | 7/2003 | Saka et al. | |
| 6,754,367 B1 * | 6/2004 | Ito et al. | 382/103 |
| 6,765,353 B2 | 7/2004 | Leleve | |
| 6,791,723 B1 * | 9/2004 | Vallmajo et al. | 358/488 |
| 6,965,695 B2 * | 11/2005 | Yamakawa | 382/199 |
| 7,036,963 B2 | 5/2006 | Fukawa | 362/465 |
| 7,046,822 B1 * | 5/2006 | Knoeppel et al. | 382/103 |
| 2001/0033680 A1 * | 10/2001 | Bankman et al. | 382/128 |
| 2002/0005778 A1 * | 1/2002 | Breed et al. | 340/435 |
| 2002/0031242 A1 * | 3/2002 | Yasui et al. | 382/104 |
| 2002/0080618 A1 * | 6/2002 | Kobayashi et al. | 362/466 |
| 2002/0130953 A1 * | 9/2002 | Riconda et al. | 348/115 |
| 2002/0145665 A1 * | 10/2002 | Ishikawa et al. | 348/148 |
| 2003/0002713 A1 * | 1/2003 | Chen | 382/104 |
| 2003/0103649 A1 * | 6/2003 | Shimakage | 382/104 |
| 2003/0103684 A1 * | 6/2003 | Gobush et al. | 382/286 |
| 2003/0163239 A1 * | 8/2003 | Winner et al. | 701/93 |
| 2003/0231856 A1 * | 12/2003 | Ikeda | 386/46 |
| 2004/0101169 A1 * | 5/2004 | Tisse et al. | 382/117 |
| 2004/0184669 A1 * | 9/2004 | Tan et al. | 382/268 |
| 2007/0106475 A1 * | 5/2007 | Kondoh | 701/301 |

FOREIGN PATENT DOCUMENTS

| | | |
|---|---|---|
| JP | 2001-134769 | 5/2001 |
| JP | 2001-256484 | 9/2001 |
| JP | 2002-099908 | 4/2002 |
| JP | 2002-160598 | 6/2002 |
| JP | 2002-162343 | 6/2002 |
| JP | 2002-310896 | 10/2002 |
| JP | 2003-121345 | 4/2003 |

OTHER PUBLICATIONS

Office Action issued from Japan Patent Office dated Jul. 24, 2008 in corresponding Japanese Patent Application No. 2004-007338 (Abstract).

* cited by examiner

AR

AR

AR

ARH1   ARH2

AR

ROAD SURFACE REFLECTION DETECTING APPARATUS

CROSS REFERENCE TO RELATED APPLICATION

This application is based on and incorporates herein by reference Japanese Patent Application No. 2004-7338 filed Jan. 14, 2004.

FIELD OF THE INVENTION

The present invention relates to a road surface reflection detecting apparatus.

BACKGROUND OF THE INVENTION

A road surface reflection detecting apparatus has been proposed as an apparatus for determining whether the surface of a road is shiny. An example of the road surface reflection detecting apparatus is disclosed in JP 2000-180378A.

In accordance with this road surface reflection detecting apparatus, light beams generated by a light source are radiated to a location on the surface of a road and the picture (image) of the radiated location is taken. Then, a portion of the picture included in a predetermined cutout range with luminance at least equal to a predetermined threshold value is extracted as a partial picture based on regularly reflected light beams. Finally, the area and aspect ratio of the partial picture are compared with reference value to determine whether the surface of the road is shiny.

In addition, in a configuration including a camera mounted on the vehicle for taking a picture, a light beam reflected from a reflection plate provided on a road side to which an illuminant on the vehicle radiates a light beam is used for determining whether the surface of a road is shiny.

The conventional road surface reflection detecting apparatus extracts a picture with high luminance based on a picture in a predetermined cutout range. In a configuration including a camera mounted on the vehicle for taking a picture, however, a road in front of the vehicle can be a straight or curved road. Thus, with the predetermined cutout range, a picture on a road surface cannot be cut out properly from a taken picture.

When a cutout range is predetermined based on a travel motion condition on a straight line, for example, in a travel motion condition of a curved line, a road-side body (obstacle) such as a guard rail appears on the picture in the cutout range in some cases. In such cases, for example, the headlight beam of the vehicle is reflected by the guard rail, forming an area with high luminance. Thus, the light beam reflected by the guard rail is detected erroneously as a shiny state of the road surface.

SUMMARY OF THE INVENTION

It is thus an object of the present invention to provide a road surface reflection detecting apparatus capable of keeping up with variations in road environment in front of a subject vehicle.

A road surface reflection detecting apparatus according to the present invention recognizes a road in a taken picture (image) of a road in front of the vehicle, extracts a partial picture from the recognized road and detects the degree of reflection of light from the surface of the road from the partial picture extracted from the recognized road. In this way, the degree of reflection from the surface of a road can be detected from the picture in a road not including a road-side body (obstacle) such as a guard rail without regard to whether the road in front of a vehicle is a straight or curved road. As a result, the road surface reflection detecting apparatus is capable of keeping up with variations in road environment in front of a vehicle.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENT

First Embodiment

Figure 1:
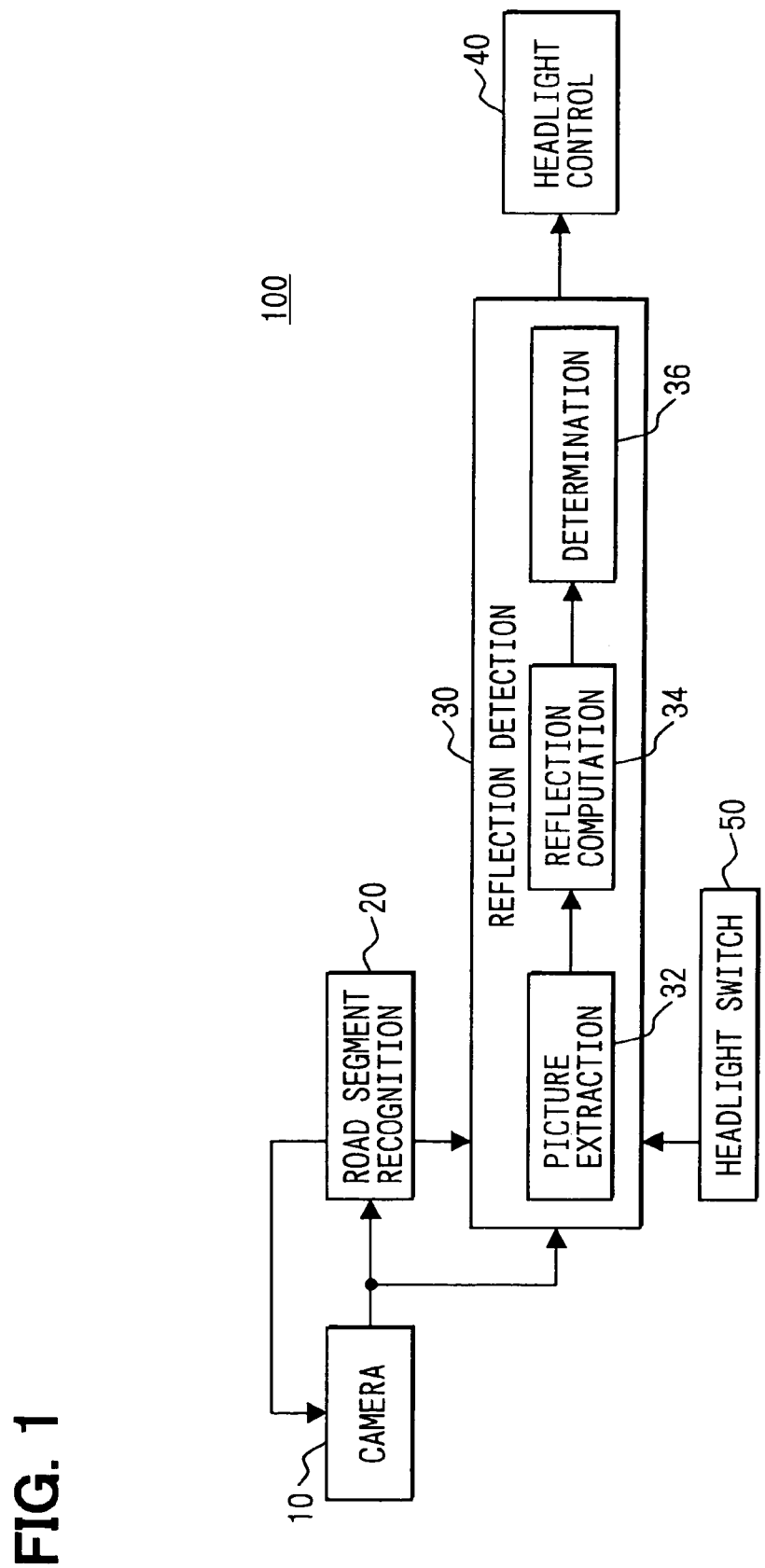
FIG. 1 is a block diagram showing a road surface reflection detecting apparatus according to a first embodiment of the present invention.

As shown in FIG. 1, a road surface reflection detecting apparatus 100 comprises a camera 10, a road recognition unit 20, a road surface reflection detection unit 30, a headlight control unit 40, and a headlight switch 50.

Figure 2:
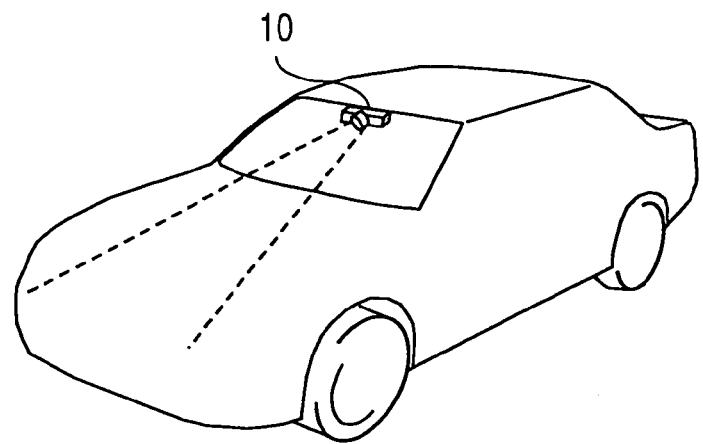
FIG. 2 is a diagram showing the location of a camera for taking a picture of a road in front of a vehicle.

The camera 10 is typically a video camera, which is provided at a location allowing the camera to take a picture (image) of a road in front of a subject vehicle as shown in FIG. 2. At a photographing time, the camera 10 controls a shutter speed, a frame rate, and a gain in accordance with gain, shutter speed and frame-rate signals received from the road recognition unit 20.

At that time, the camera 10 also controls an output gain of a pixel value signal included in a picture signal output to the road recognition unit 20 and the road surface reflection detection unit 30. The pixel value signal is a signal representing the degree of brightness (or the luminance) of each pixel of a taken picture. It is to be noted that the picture signal of a picture includes the pixel value signal and a synchronization signal of the picture.

Figure 3:
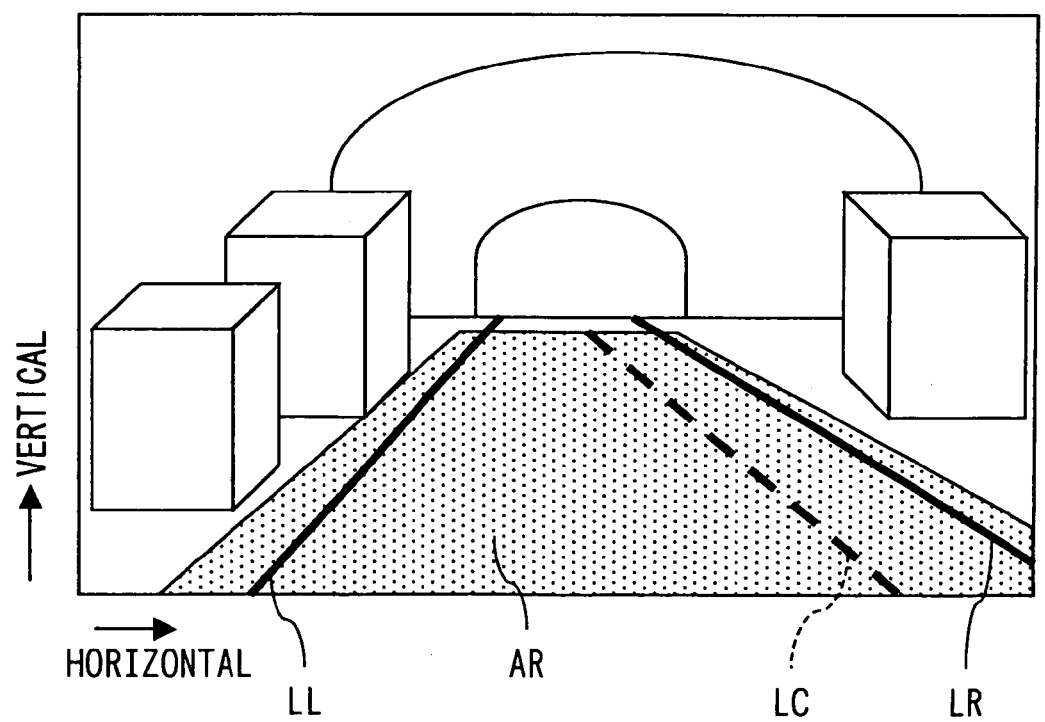
FIG. 3 is a diagram showing a typical picture taken by the camera including a road.

By using a picture signal received from the camera 10, the road recognition unit 20 recognizes a road of a road. It is assumed here that the camera 10 takes a picture including a road AR, on which driving lane marks LL, LC, and LR are painted as shown in FIG. 3. In this case, positions of pixels included in the region of the road AR along a predetermined distance measured from subject vehicle are recognized.

Road information showing the recognized positions of pixels included in the road AR is then supplied to the road surface reflection detection unit 30. It is to be noted that the road recognition unit 20 recognizes the road typically by adopting a picture analysis method such as a texture technique.

Specifically, by carrying out a picture analysis process, the road recognition unit 20 recognizes positions of pixels in the road AR, identifying horizontal pixel numbers HNs and vertical pixel numbers VNs. The horizontal pixel numbers HNs indicate the locations of pixels serving as horizontal line boundaries of the road AR, that is, the upper and lower boundaries of the road AR in the picture.

Examples of the horizontal pixel numbers HNs are 10 HN to 23 HN. On the other hand, the vertical pixel numbers VNs indicate the locations of pixels serving as vertical line boundaries of the road AR, that is, the left and right boundaries of the road AR in the picture. Examples of the vertical pixel numbers VNs are 20 VN to 28 VN. Then, road information, which is a combination of the recognized horizontal pixel numbers and the recognized vertical pixel numbers, is supplied to the road surface reflection detection unit 30.

Based on the pixel value signal of each pixel received from the camera 10, the road recognition unit 20 controls the output gain, shutter speed, and frame rate of the camera 10 to make the brightness of the picture fall in a predetermined range.

As shown in FIG. 1, the road surface reflection detection unit 30 comprises a picture extraction unit 32, a road surface reflection computation unit 34, and a determination unit 36. The road surface reflection detection unit 30 receives the picture signal from the camera 10, the road information from the road recognition unit 20, and switch information from the headlight switch 50, supplying a degree of reflection from the road AR on the surface of a road to the headlight control unit 40.

The picture extraction unit 32 is for using the road information received from the road recognition unit 20 to extract (cut out) the picture of the road AR from a picture taken by the camera 10. The road surface reflection computation unit 34 is for computing an average of luminance value of all pixels in the road AR based on a picture signal of the picture of the road AR extracted by the picture extraction unit 32. The average of luminance value of all pixels in the road AR is referred to as a luminance average value.

The determination unit 36 is for determining whether the luminance average value found by the road surface reflection computation unit 34 is more than a threshold value for luminance average value reflection degree information showing the degree of reflection from the surface of the road in the road AR is supplied to the headlight control unit 40. The reflection degree information is based on the result of the determination. It is to be noted that the reflection degree information is supplied to the headlight control unit 40 only when the switch information from the headlight switch 50 indicates that the headlights of subject vehicle are on.

The headlight control unit 40 is for controlling the radiation direction and light intensity of each of the headlights employed by the vehicle. The headlights themselves are shown in none of the figures. The headlight control unit 40 controls the radiation direction and light intensity of each of the headlights based on the reflection degree information received from the road surface reflection detection unit 30. Provided at a location close to the driver seat, the headlight switch 50 is a changeover switch for selecting an on or off state of the headlights employed by the vehicle. The switch information showing the on or off state of the headlights is supplied to the road surface reflection detection unit 30.

Figure 4:
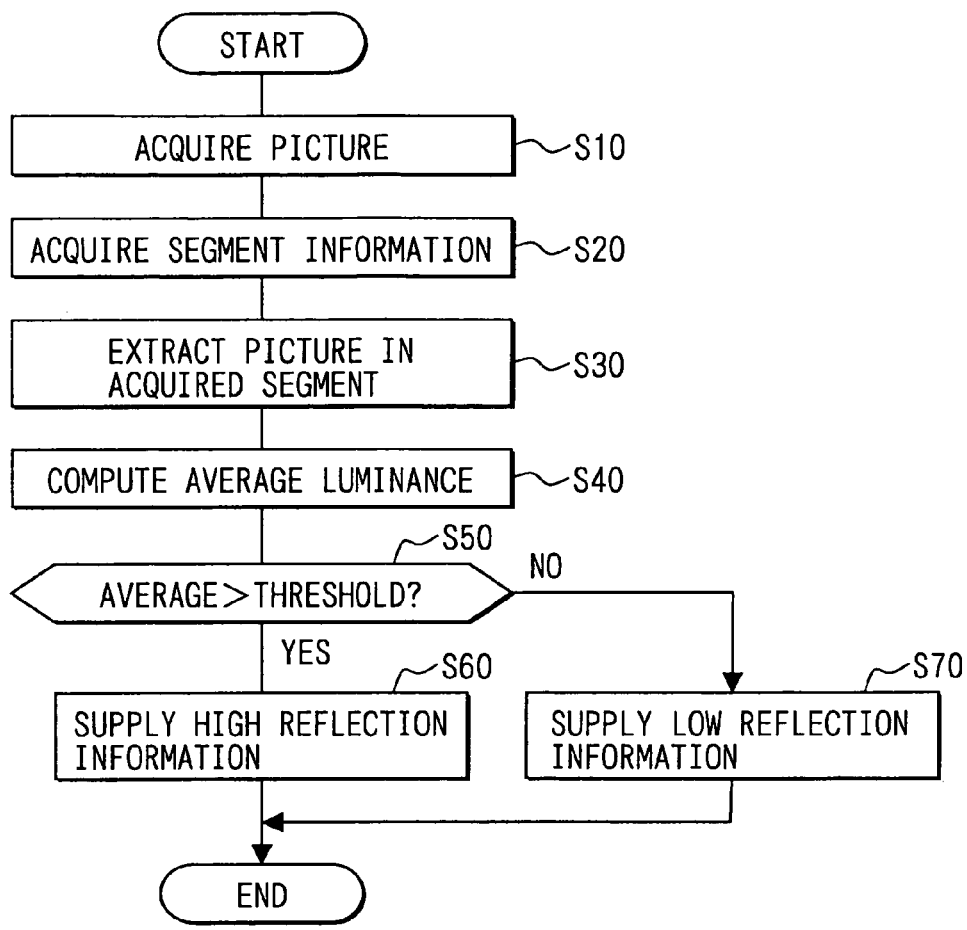
FIG. 4 shows a flowchart representing processing by a road surface reflection detection unit to determine the degree of reflection from the surface of a road based on a luminance average value in the first embodiment.

Next, by referring to a flowchart shown in FIG. 4, processing by the road surface reflection detection unit 30 in the road surface reflection detecting apparatus 100 is explained as a characteristic of this embodiment. At step S10 of the flowchart shown in the figure, the picture signal of a picture taken by the camera 10 is acquired. Then, at step S20, road information is acquired from the road recognition unit 20.

Subsequently, at step S30, the picture of a road is extracted from the picture taken by the camera 10. Then, at step S40, an average luminance value of pixels composing the picture of the extracted road is computed. Subsequently, at step S50, the average luminance value computed at step S40 is compared with a predetermined luminance threshold value to determine whether the average luminance value is more than the luminance threshold value. When the average luminance value is determined to be more than the luminance threshold value, the processing proceeds to step S60. When the average luminance value is determined to be smaller than the luminance threshold value, on the other hand, the processing proceeds to step S70.

At step S60, since the average luminance value is more than the luminance threshold value reflection degree information showing a high degree of reflection from the surface of the road in the road AR, that is, reflection degree information indicating that reflection from the surface of the road exists, is generated and supplied to the headlight control unit 40.

At step S70, on the other hand, since the average luminance value is smaller than the luminance threshold value reflection degree information showing a low degree of reflection from the surface of the road in the road AR, that is, reflection degree information indicating that no reflection from the surface of the road exists, is generated and supplied to the headlight control unit 40.

That is, a dry road surface is not shiny. Thus, the degree of reflection of a light beam reflected by the road surface is low, indicating that no reflection from the surface of the road exists. On the other hand, a wet and humid road surface is shiny. Thus, the degree of reflection of a light beam reflected by the road surface is high indicating that reflection from the surface of the road exists.

Accordingly, by taking a picture of a dry road surface experiencing radiation of a light beam and setting the luminance value of the taken picture as the luminance threshold value in advance, for example, the degree of reflection from the surface of the road can be determined by using this luminance threshold value. That is, an average luminance value, at least equal to the luminance threshold value will produce a determination result indicating that the degree of reflection from the surface of the road is high or reflection from the surface of the road exists.

Thus, when the headlight control unit 40 receives reflection degree information indicating that the degree of reflection from the surface of the road is high, control is executed to reduce the quantity of light radiated to a nearby range in front of the vehicle or narrow a radiation range on the right side in front of the vehicle to a range close to the vehicle. In this way, dazzling brightness caused by a headlight of the vehicle and felt by the driver of a vehicle coming from the opposite direction can be reduced.

It is to be noted that the reflection degree information can be applied to not only the control of the headlights, but also a safety system mounted on the vehicle as a system capable of demonstrating an effect for a low friction (μ) road having a wet and humid, ice-covered or snowy surface. Examples of the safety system are an ABS and an ACC.

As described above, the road surface reflection detecting apparatus 100 implemented by this embodiment has the road recognition unit 20 for recognizing a road in a taken picture of a road in front of the vehicle, extracting the recognized road from the picture, and determining the degree of reflection from the surface of the road based on the picture of the extracted road.

In this way, the degree of reflection from the surface of a road can be detected from a picture in a road never including a road-side body such a guard rail without regard to whether the road in front of a vehicle is a straight or curved road. As a result, the road surface reflection detecting apparatus is capable of keeping up with variations in road environment in front of a vehicle.

First Modification

Figure 5:
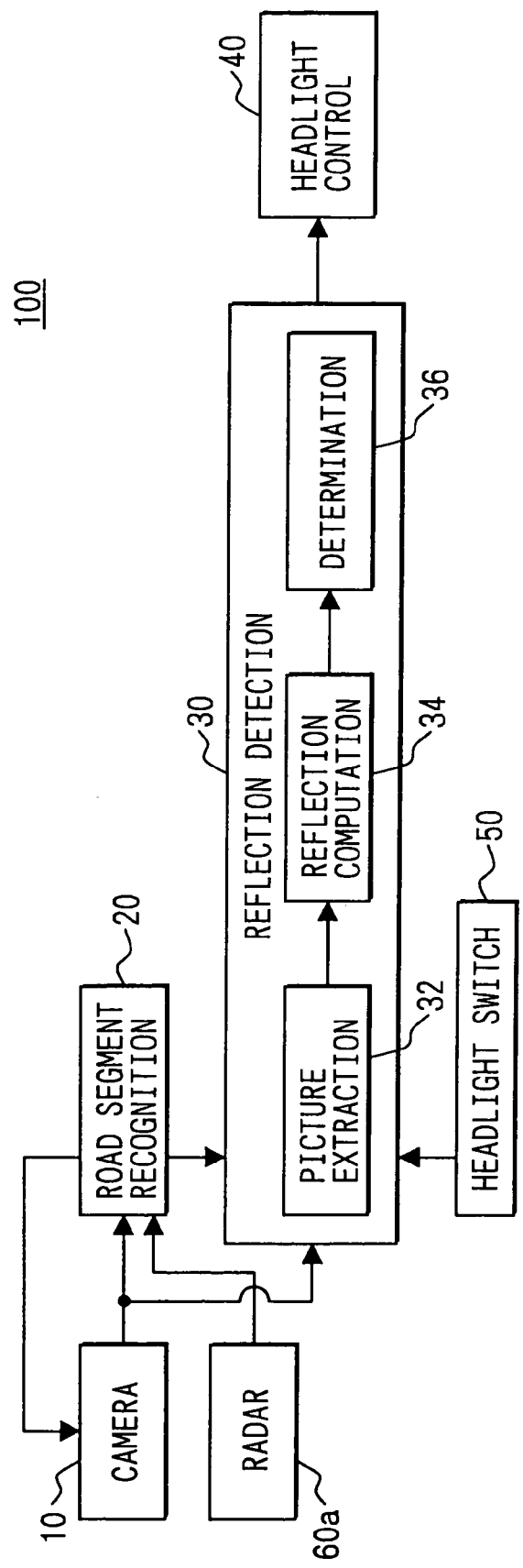
FIG. 5 is a block diagram showing a road surface reflection detecting apparatus having a milli-wave radar in a first modification of the first embodiment.

In this modification, the picture extraction unit 32 extracts a picture of a road located between subject vehicle and a body in front of subject vehicle in case the body in front of subject vehicle is detected. An example of the body in front of subject vehicle is a vehicle running immediately ahead of subject vehicle. As shown in FIG. 5, a road surface reflection detecting apparatus 100 provided by this modification has a milli-wave radar 60*a* for detecting a distance from subject vehicle to the preceding body such as a vehicle running immediately ahead of subject vehicle.

The milli-wave radar 60*a* supplies distance information indicating the distance from subject vehicle to the preceding body such as a vehicle running immediately ahead of subject vehicle to the road recognition unit 20. The milli-wave radar 60*a* radiates a milli-wave to an area within a predetermined range in front of the vehicle and, from a reflected wave, determines the distance from subject vehicle to the preceding body such as a vehicle running immediately ahead of subject vehicle and its direction.

It is to be noted that means for detecting a preceding body such as a vehicle running immediately ahead of subject vehicle are not limited to the milli-wave radar 60*a*. For example, means using a microwave or a radar using an ultrasonic wave can also be employed. In addition, a body including a vehicle running immediately ahead of subject vehicle also can be detected from a picture taken by the camera 10.

In a process to extract a picture of a road, the picture extraction unit 32 extracts a picture of the road located between subject vehicle and a preceding body such as a vehicle running immediately ahead of subject vehicle by using the distance information supplied by the milli-wave radar 60*a* by way of the road recognition unit 20.

Figure 6A:
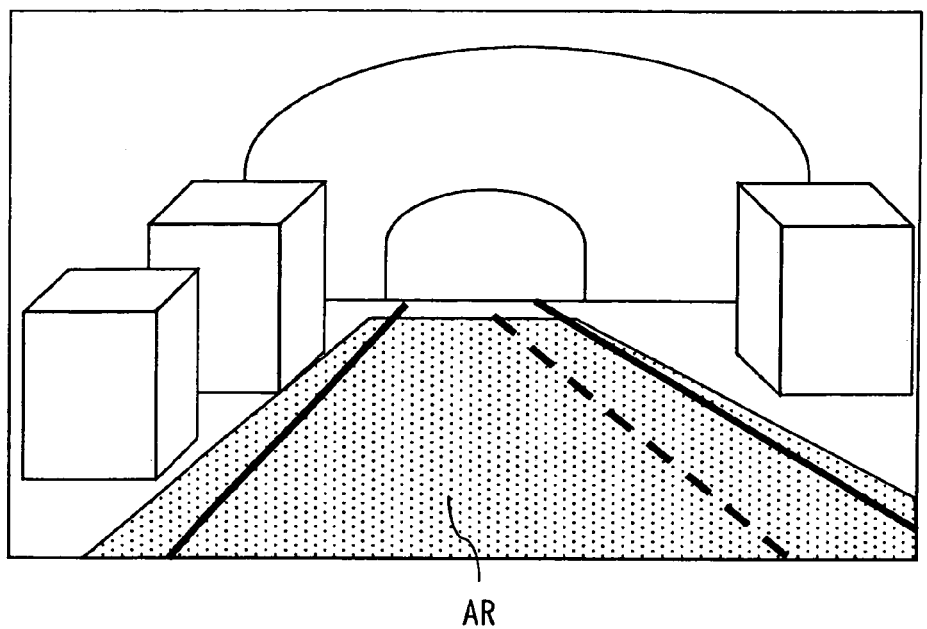
FIG. 6A is a diagram showing the range of a regular cutout.
Figure 6B:
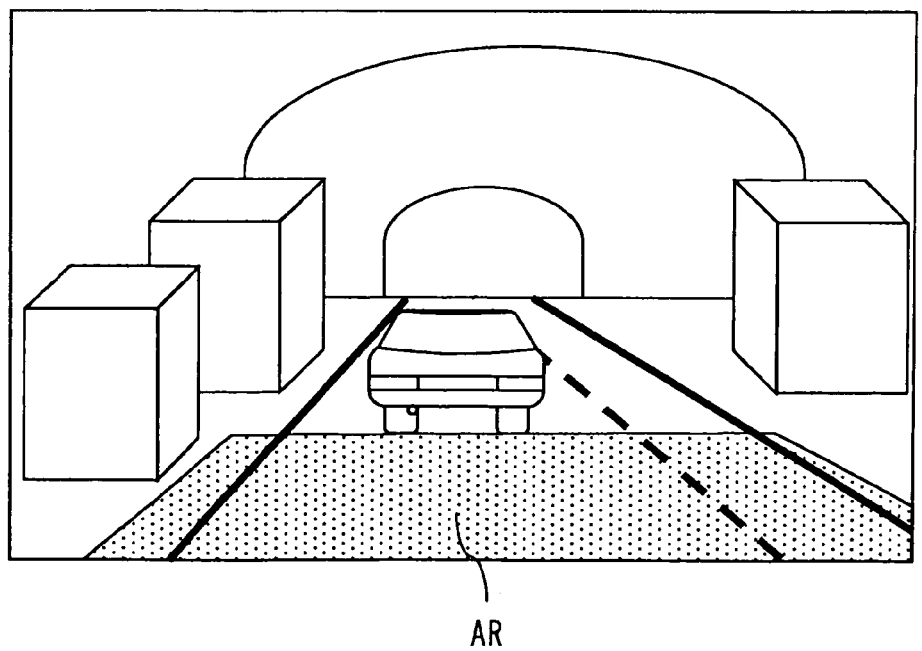
FIG. 6B is a diagram showing the range of a cutout based on a distance.

Thus, as shown in FIG. 6A, when no preceding body such as a vehicle running immediately ahead of subject vehicle is detected, the road AR within a predetermined front distance from subject vehicle is normally extracted as a cutout range. When a preceding body such as a vehicle running immediately ahead of subject vehicle is detected as shown in FIG. 6B, on the other hand, a picture of a road AR located between subject vehicle and the preceding body such as a vehicle running immediately ahead of subject vehicle is extracted.

In this way, since a picture within a road not including a body existing in front of subject vehicle is extracted, a light beam reflected for example by a reflecting plate on the rear portion of the vehicle running immediately ahead can be prevented from being detected mistakenly as a light beam reflected by the surface of the road.

Second Modification

This modification determines the range of a picture to be extracted by the picture extraction unit 32 in accordance with whether the speed of subject vehicle is high or low and extracts a picture of the determined range. As explained in the description of this embodiment, the picture extraction unit 32 extracts the picture of a road within a predetermined distance in front of subject vehicle. In this modification, however, the distance is changed in accordance with whether the speed of subject vehicle is high or low.

Figure 7:
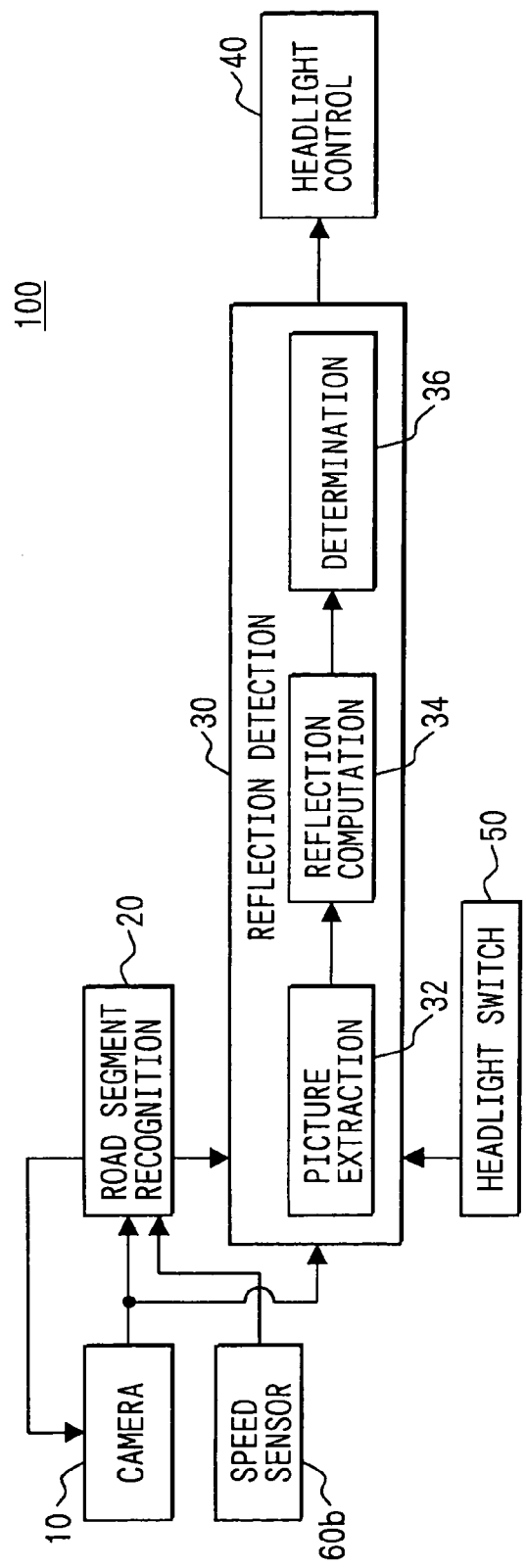
FIG. 7 is a block diagram showing a road surface reflection detecting apparatus having a vehicle speed sensor in a second modification of the first embodiment.

As shown in FIG. 7, the road surface reflection detecting apparatus 100 implemented by this modification has a vehicle speed sensor 60b for detecting the speed of subject vehicle and supplying speed information representing the detected speed to the road recognition unit 20. The road recognition unit 20 shown in the same figure passes on the speed information received from the vehicle speed sensor 60b to the picture extraction unit 32, which changes the range in front of subject vehicle based on the speed information as a range of a picture to be taken.

That is, in many cases, the driver generally drives the vehicle by keeping a short distance to a vehicle running immediately ahead at a low speed but a long distance to a vehicle running immediately ahead at a high speed. Thus, at a high speed of subject vehicle, for example, a predetermined long distance is set but, at a low speed of subject vehicle, a predetermined short distance is set. Thus, when a picture is extracted, a vehicle running immediately ahead can be prevented by all means from being included in the extracted picture.

It is to be noted that, at a very low speed of subject vehicle, a picture can be prevented from being extracted. In this way, a picture including a vehicle running immediately ahead stopped in a state of waiting for a traffic light to change can be prevented from being extracted.

Third Modification

Figure 8:
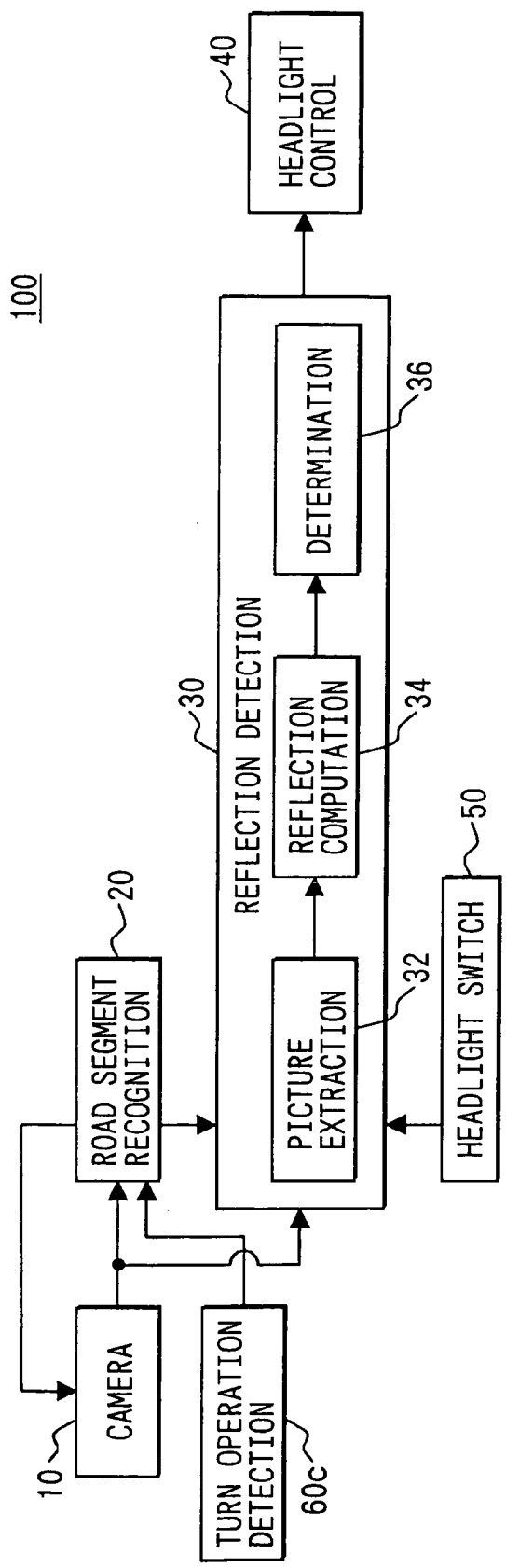
FIG. 8 is a block diagram showing a road surface reflection detecting apparatus having an operation detection unit in a third modification of the first embodiment.

This modification determines the range of a picture to be extracted by the picture extraction unit 32 based on a result of detecting an operation of a turn direction indicator employed in subject vehicle. As shown in FIG. 8, the road surface reflection detecting apparatus 100 implemented by this modification has an operation detection unit 60c for detecting an operation of the turn direction indicator in subject vehicle and supplying operation information representing a detected operation of the turn direction indicator to the road recognition unit 20.

The road recognition unit 20 shown in the same figure passes on the speed information received from the operation detection unit 60c to the picture extraction unit 32, which determines the range of a picture to be taken based on the operation information. When an operation of the turn direction indicator is detected, for example, a picture immediately preceding subject vehicle is determined as a range to be extracted. Thus, when subject vehicle is turning right or left at a street crossing, for example, a picture including bodies outside the road can be prevented from being extracted.

Fourth Modification

Figure 9:
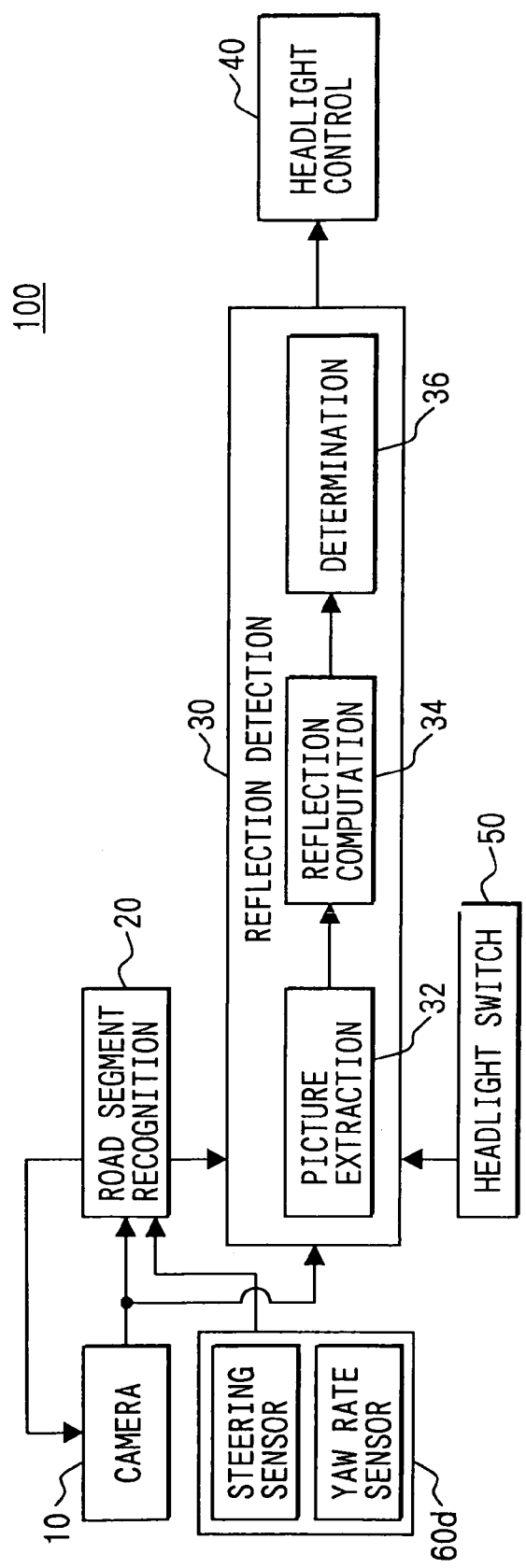
FIG. 9 is a block diagram showing a road surface reflection detecting apparatus having a vehicle condition detection unit in a fourth modification of the first embodiment.

This modification determines the range of a picture to be extracted by the picture extraction unit 32 based on a result of detecting the state of subject vehicle. Examples of the state of subject vehicle are the steering angle of the steering wheel in subject vehicle and a yaw rate, which is the angular speed around the vertical direction. As shown in FIG. 9, the road surface reflection detecting apparatus 100 implemented by this modification has a vehicle condition detection unit 60d comprising a steering-angle sensor for detecting the steering angle of the steering wheel in subject vehicle and a yaw-rate sensor for detecting the yaw rate of subject vehicle. The vehicle condition detection unit 60d supplies vehicle condition information showing the vehicle condition detected by the sensors to the road recognition unit 20.

The road recognition unit 20 shown in the same figure passes on the vehicle condition information received from the vehicle condition detection unit 60d to the picture extraction unit 32, which determines the range of a picture to be taken based on the vehicle condition information. When a steering angle greater than a predetermined steering angle and/or a yaw rate greater than a predetermined yaw rate are detected, for example, a picture immediately preceding subject vehicle is determined as a range to be extracted. Thus, when subject vehicle is turning right or left at a street crossing or running along an abruptly curved road, for example, a picture including bodies outside the road can be prevented from being extracted.

It is to be noted that the vehicle condition detection unit 60d may also include only either one of the steering-angle sensor and the yaw-rate sensor. In addition, a yaw rate can also be detected from a picture taken by the camera 10. By detecting the generally known optical flow, for example, the movement of the picture along the time axis can be detected. Thus, a yaw rate can be inferred from a result of detecting this optical flow.

Fifth Modification

The range of a picture to be extracted can also be determined based on a plurality of pieces of information, which are selected among the speed information, the operation information, and the vehicle condition information of respectively the second, third, and fourth modifications explained earlier. When the speed information indicates a detected high speed even if the operation information indicates a detected operation of the turn direction indicator, for example, the vehicle is assumed to be in a state of changing the running lane instead of a state of turning right or left at a street crossing or running along an abruptly curved road. Thus, in such a case, the range of a picture to be extracted is determined in accordance with whether the speed of subject vehicle is high or low, so that a picture in a proper range can be extracted.

Sixth Modification

Since the road recognition unit 20 provided by this embodiment determines a road AR, the extracted picture may include bodies including road paint such as traveled segment lines LL, LC, and LR in some cases as shown in FIG. 3. Since the pixel positions of these designations each have high luminance, they are detected mistakenly as a high degree of reflection from the surface of the road.

Thus, by excluding the luminance value of recognized pixel positions from objects of calculation when the pixel positions are recognized by adopting for example a method such as the picture analysis technique as pixel positions of driving lane marks and road paint, these driving lane marks and road paint can be prevented from being detected mistakenly as a high degree of reflection from the surface of the road.

Second Embodiment

In the road surface reflection detection unit 30 in the first embodiment, as described earlier, the road surface reflection computation unit 34 computes a luminance average value, which is an average of luminance value of pixels in a road, and the determination unit 36 determines whether the luminance average value computed by the road surface reflection computation unit 34 is more than a luminance threshold value for luminance average value.

The second embodiment is different from the first one in that, in the road surface reflection detection unit 30 in the second embodiment, the road surface reflection computation unit 34 computes a luminance gradient for each horizontal line in the road and a luminance average gradient, whereas the determination unit 36 determines whether the luminance average gradient computed by the road surface reflection computation unit 34 is more than a luminance gradient threshold value, the luminance gradient for a horizontal line represents the rate of change in luminance among pixels in the direction of the horizontal line. On the other hand, the luminance average gradient is the average of luminance gradients of all the horizontal lines.

Figure 10A:
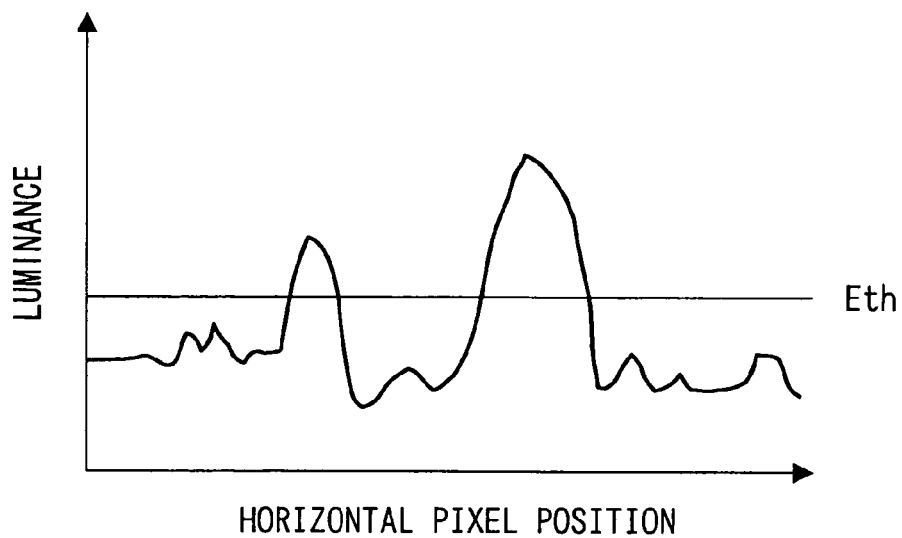
FIG. 10A is a picture diagram for identifying a horizontal pixel number indicating a horizontal line having a luminance value exceeding a predetermined value.
Figure 10B:
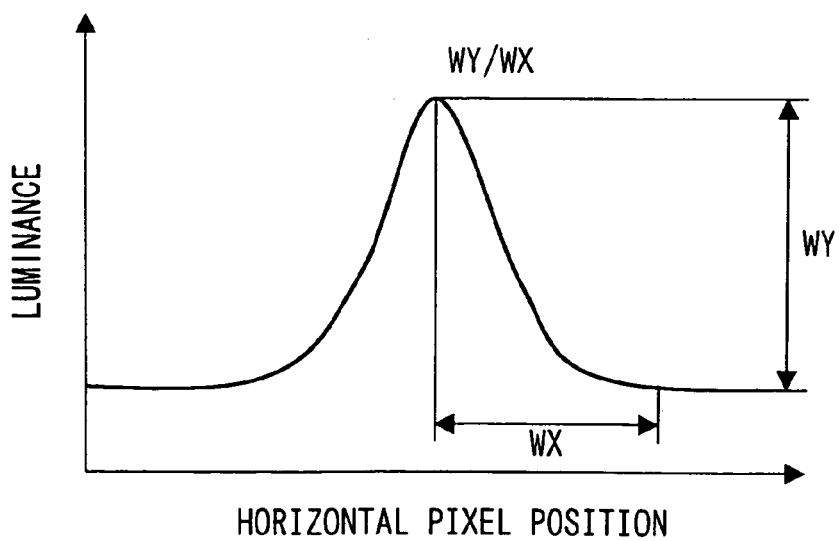
FIG. 10B is a picture diagram for computing a luminance gradient representing the rate of change in luminance value for pixels in the direction of a horizontal line.

First, from the picture of the road extracted by the picture extraction unit 32, the road surface reflection computation unit 34 identifies a horizontal picture number HN indicating a horizontal line having luminance value each exceeding a predetermined threshold value Eth as shown in FIG. 10A. Then, the road surface reflection computation unit 34 computes a luminance gradient WY/WX showing the rate of change in luminance among pixels in the direction of a horizontal line indicated by the identified horizontal picture number HN for the horizontal line as shown in FIG. 10B. Afterwards, the road surface reflection computation unit 34 computes a luminance average gradient, which is the average of luminance gradients of all the horizontal lines indicated by all horizontal pixel numbers HNs.

The determination unit 36 determines whether the luminance average gradient is more than a luminance gradient threshold value for luminance average gradients, and supplies reflection gradient information to the headlight control unit 40. The reflection gradient information indicates the degree of reflection from the surface of the road based on a determination result.

Figure 11:
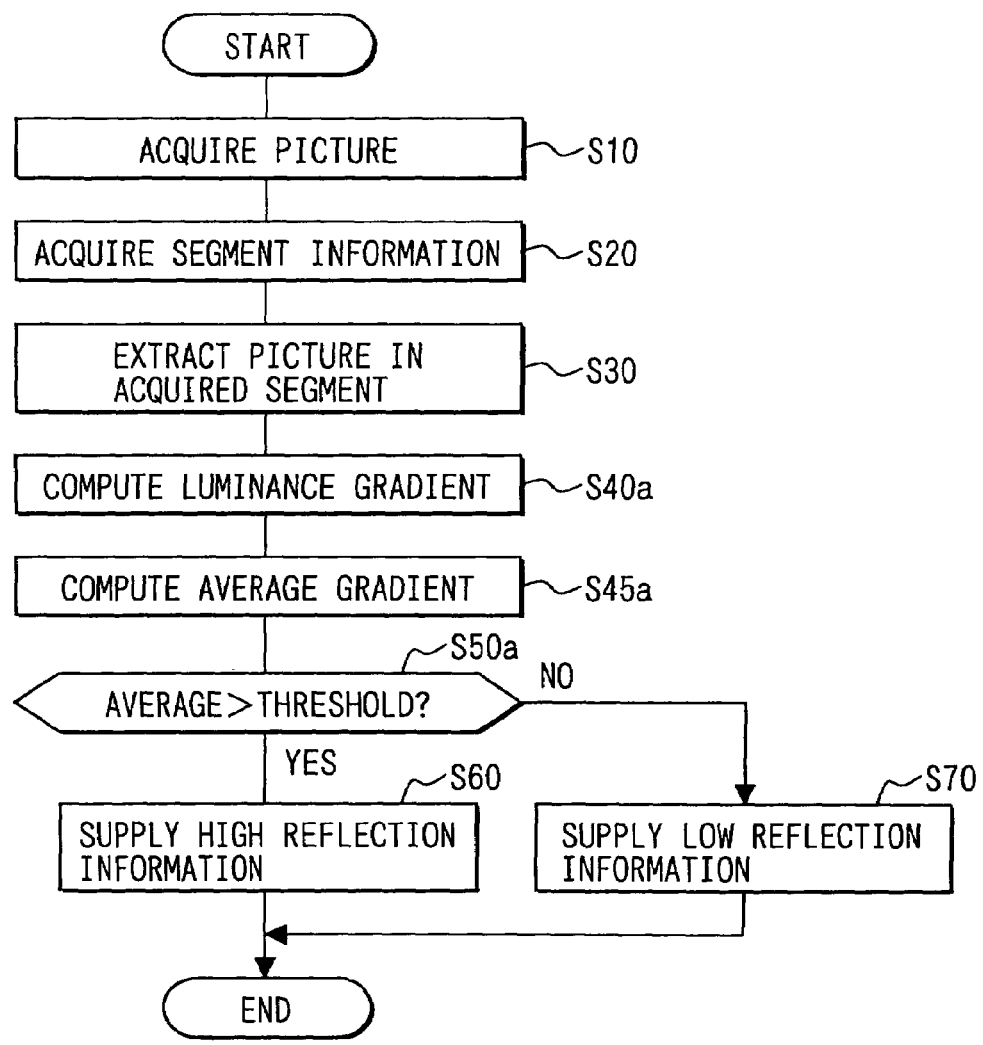
FIG. 11 shows a flowchart representing processing by the road surface reflection detection unit to determine the degree of reflection from the surface of a road based on a luminance gradient in a second embodiment.

Next, by referring to a flowchart shown in FIG. 11, processing by the road surface reflection detection unit 30 in the road surface reflection detecting apparatus 100 is explained.

At step S40a, a luminance gradient for a horizontal line showing luminance value each exceeding the predetermined threshold value Eth is computed from pixels of a road extracted at step S30. At step S45a, an average luminance gradient for all horizontal lines is found.

At step S50a, the average luminance gradient computed at step S45a is compared with the luminance gradient threshold value to determine whether the luminance average gradient is more than the luminance gradient threshold value. When the luminance average gradient is determined to be more than the luminance gradient threshold value, the processing proceeds to step S60. When the luminance average gradient is determined to be smaller than the luminance gradient threshold value, on the other hand, the processing proceeds to step S70.

At step S60, since the average luminance gradient is more than the luminance gradient threshold value reflection degree information showing a high degree of reflection from the surface of the road in the road, that is, reflection degree information indicating that reflection from the surface of the road exists, is generated and supplied to the headlight control unit 40.

At step S70, on the other hand, since the average luminance gradient is smaller than the luminance gradient threshold value reflection degree information showing a low degree of reflection from the surface of the road in the road, that is, reflection degree information indicating that no reflection from the surface of the road exists, is generated and supplied to the headlight control unit 40.

Namely, when a light beam is radiated to a road, the luminance value of pixels in a region hit by the radiated light beam is high in comparison with pixels in a region not hit by the radiated light beam. However, the differences in luminance value for a wet and humid surface of the road are greater than those for a dry surface of the road.

Accordingly, by taking a picture of a dry road surface experiencing radiation of a light beam and setting the rate of change in luminance of the taken picture as the luminance gradient threshold value in advance, for example, the degree of reflection from the surface of the road can be determined by using this luminance gradient threshold value. That is, an average luminance gradient at least equal to the luminance gradient threshold value will produce a determination result indicating that the degree of reflection from the surface of the road is high or reflection from the surface of the road exists. It is to be noted that the first to sixth modifications described above can of course be applied to this embodiment.

Third Embodiment

The third embodiment is different from the second embodiment in that, in the road surface reflection detection unit 30, the road surface reflection computation unit 34 computes a luminance gradient for each horizontal line and finds a luminance gradient count representing the number of luminance gradients computed for horizontal lines whereas the determination unit 36 determines whether the luminance gradient count computed by the road surface reflection computation unit 34 is more than a luminance gradient count threshold value for a plurality of horizontal lines.

First, from the picture of the road extracted by the picture extraction unit 32, the road surface reflection computation unit 34 identifies a horizontal picture number HN showing a horizontal line with luminance value each exceeding a predetermined threshold value Eth as shown in FIG. 10A. Then, the road surface reflection computation unit 34 computes a luminance gradient WY/WX showing the rate of change in luminance among pixels in the direction of a horizontal line indicated by the identified horizontal picture number HN for the horizontal line as shown in FIG. 10B. Afterwards, the road surface reflection computation unit 34 computes a luminance gradient count for horizontal lines indicated by horizontal pixel numbers HNs.

The determination unit 36 determines whether the luminance gradient count is more than a luminance gradient count threshold value for luminance gradient counts, and supplies reflection gradient information to the headlight control unit 40. The reflection gradient information indicates the degree of reflection from the surface of the road based on a determination result.

Figure 13:
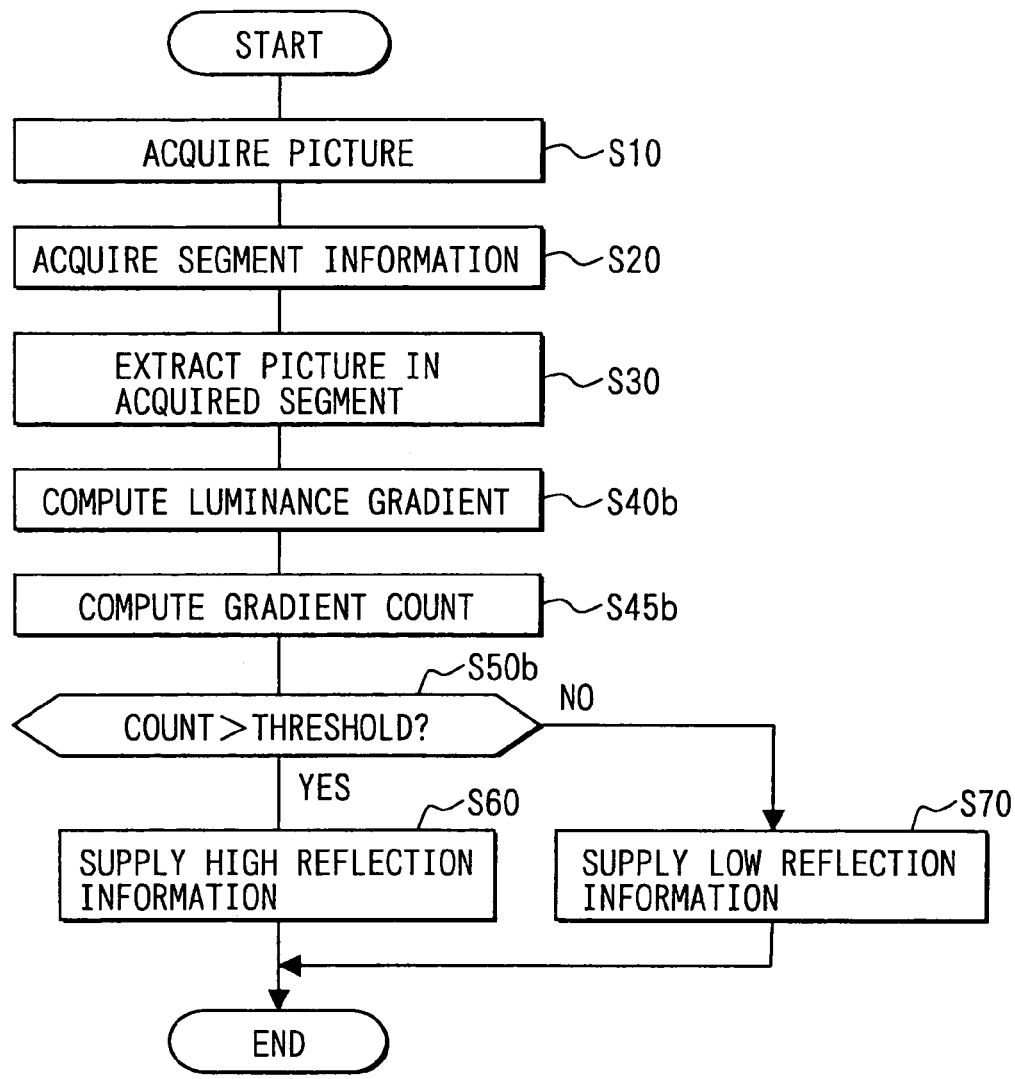
FIG. 13 shows a flowchart representing processing by the road surface reflection detection unit to determine the degree of reflection from the surface of a road based on the number of luminance gradients in a third embodiment.

Next, by referring to a flowchart shown in FIG. 13, processing by the road surface reflection detection unit 30 in the road surface reflection detecting apparatus 100 is explained as a characteristic of this embodiment.

At step S40b, a luminance gradient for a horizontal line showing luminance value each exceeding the predetermined threshold value Eth is computed from pixels of a road extracted at step S30. At step S45b, a luminance gradient count for horizontal lines is found.

At step S50b, the luminance gradient count computed at step S45b is compared with the luminance gradient count threshold value to determine whether the luminance gradient count is more than the luminance gradient count threshold value. When the luminance gradient count is determined to be more than the luminance gradient count threshold value, the processing proceeds to step S60. When the luminance gradient count is determined to be smaller than the luminance gradient count threshold value, on the other hand, the processing proceeds to step S70.

At step S60, since the luminance gradient count is more than the luminance gradient count threshold value reflection degree information showing a high degree of reflection from the surface of the road in the road, that is, reflection degree information indicating that reflection from the surface of the road exists, is generated and supplied to the headlight control unit 40.

At step S70, on the other hand, since the luminance gradient count is smaller than the luminance gradient count threshold value reflection degree information showing a low degree of reflection from the surface of the road in the road, that is, reflection degree information indicating that no reflection from the surface of the road exists, is generated and supplied to the headlight control unit 40.

Figure 12A:
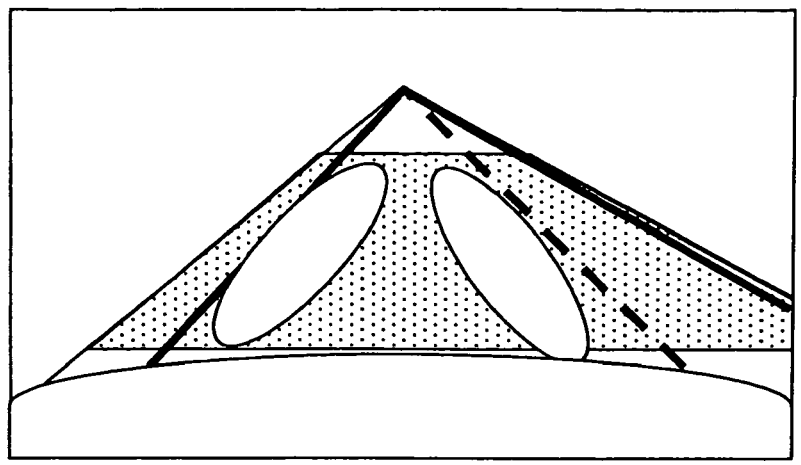
FIG. 12A is a diagram showing a picture in a road to which a light beam from a headlight of a vehicle is radiated.

It is assumed here a process to detect the degree of reflection by the surface of a road from a picture in a road to which light beams from headlights of the vehicle are radiated as shown in FIG. 12A. In this case, since the vehicle has the headlights provided on the left and right sides, two luminance gradients are detected from the picture in the road provided that the surface of the road is wet and humid.

Figure 12B:
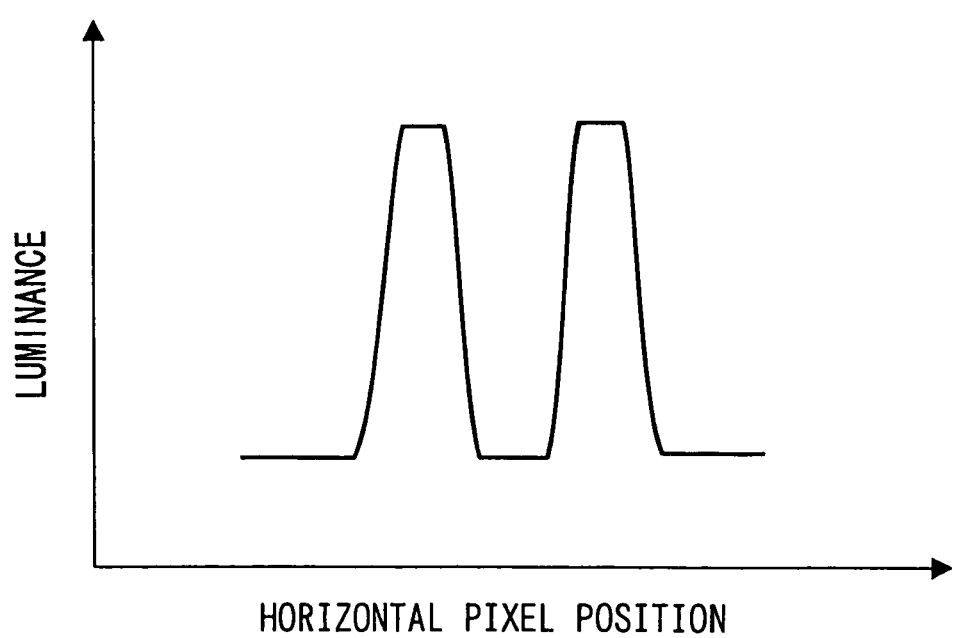
FIG. 12B is a diagram showing an example for computing a plurality of luminance gradients.

Thus, when the luminance gradient count is greater than one (for example, the count is at least two) for a plurality of horizontal lines (for example, for all horizontal lines) as shown in FIG. 12B, a detection result can be obtained as a result indicating a high degree of reflection from the surface of the road due to the light beams radiated by the headlights of the vehicle, that is, a result indicating existence of reflection from the surface of the road. It is to be noted that the first to sixth modifications described above can of course be applied to this embodiment.

Fourth Embodiment

Since there are many bodies common to the first and fourth embodiments, detailed descriptions of the common bodies are omitted from the following explanation. That is, the fourth embodiment is explained by putting emphasis on only differences between the embodiments. In the road surface reflection detection unit 30 in the first embodiment, as described earlier, the road surface reflection computation unit 34 computes a luminance average value, which is an average of luminance value of pixels in a road, and the determination unit 36 determines whether the luminance average value computed by the road surface reflection computation unit 34 is more than a luminance threshold value for luminance average value.

The fourth embodiment is different from the first one in that, in the road surface reflection detection unit 30 in the second embodiment, the road surface reflection computation unit 34 locates the position of each pixel having high luminance at least equal to a threshold value based on luminance value of pixels in a road and computes a pixel count representing the number of pixels in a high luminance area comprising the located pixel positions whereas the determination unit 36 determines whether the pixel count in the area having high luminance value computed by the road surface reflection computation unit 34 is more than a pixel count threshold value for pixel counts.

First, the road surface reflection computation unit 34 identifies horizontal and vertical pixel numbers (HN and VN) showing pixel positions each having a luminance value, at least equal to a threshold value from the picture of a road extracted by the picture extraction unit 32. Then, a pixel count in a high luminance area comprising located pixel positions indicated by the identified horizontal and vertical pixel numbers (HN and VN) is computed. Namely, the picture of the road is converted into a digitized picture and the pixel count in a high luminance area of the digitized picture is found.

The determination unit 36 determines whether the pixel count in an area having high luminance value is more than the pixel count threshold value for pixel counts, and supplies reflection gradient information to the headlight control unit 40. The reflection gradient information indicates the degree of reflection from the surface of the road based on a determination result.

Figure 15:
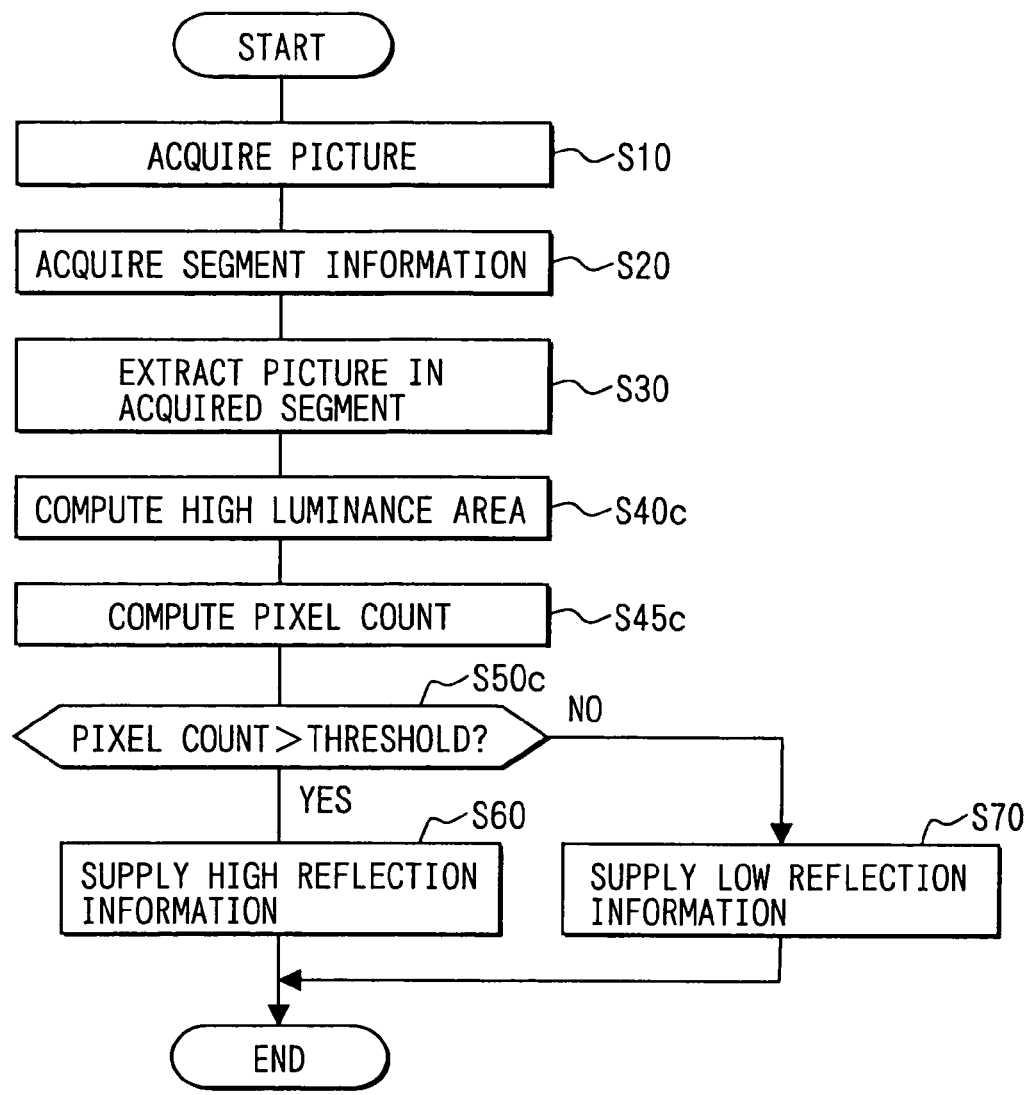
FIG. 15 shows a flowchart representing processing by the road surface reflection detection unit to determine the degree of reflection from the surface of a road based on the number of pixels in an area having high luminance value in a fourth embodiment.

Next, by referring to a flowchart shown in FIG. 15, processing by the road surface reflection detection unit 30 in the road surface reflection detecting apparatus 100 is explained as a characteristic of this embodiment.

At step S40c, from the picture of the road extracted at step S30, an area having high luminance value is recognized. This area having high luminance value is an area comprising pixel positions indicated by horizontal/vertical pixel numbers HNs/VNs each showing a luminance value, at least equal to a predetermined threshold value, at step S45c, a pixel count representing the number of pixels in the area having high luminance value is computed.

At step S50c, the pixel count in the high luminance area computed at step S45c is compared with the pixel count threshold value to determine whether the number of pixels is more than the pixel count threshold value. When the pixel count is determined to be more than the pixel count threshold value, the processing proceeds to step S60. When the pixel count is determined to be smaller than the pixel count threshold value, on the other hand, the processing proceeds to step S70.

At step S60, since the pixel count is more than the pixel count threshold value reflection degree information showing a high degree of reflection from the surface of the road in the road, that is, reflection degree information indicating that reflection from the surface of the road exists, is generated and supplied to the headlight control unit 40.

At step S70, on the other hand, since the pixel count is smaller than the pixel count threshold value reflection degree information showing a low degree of reflection from the surface of the road in the road, that is, reflection degree information indicating that no reflection from the surface of the road exists, is generated and supplied to the headlight control unit 40.

Figure 14A:
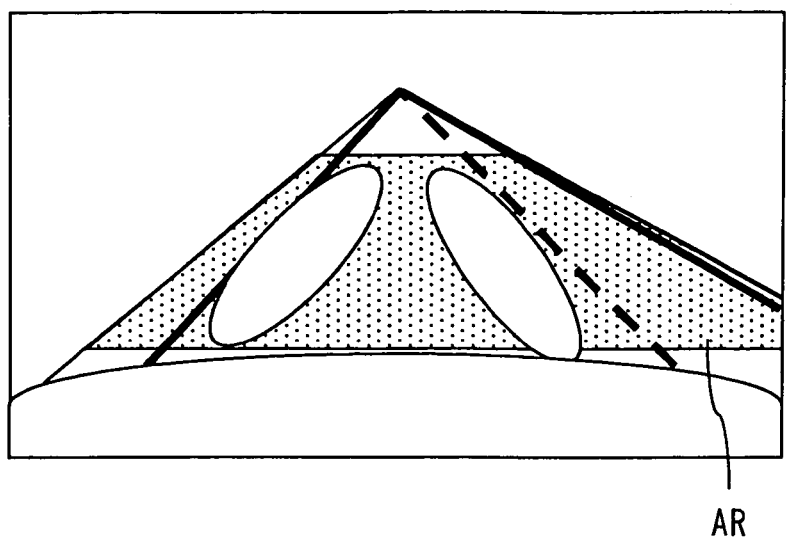
FIG. 14A is a diagram showing a picture in a road AR to which a light beam from a headlight of a vehicle is radiated.
Figure 14B:
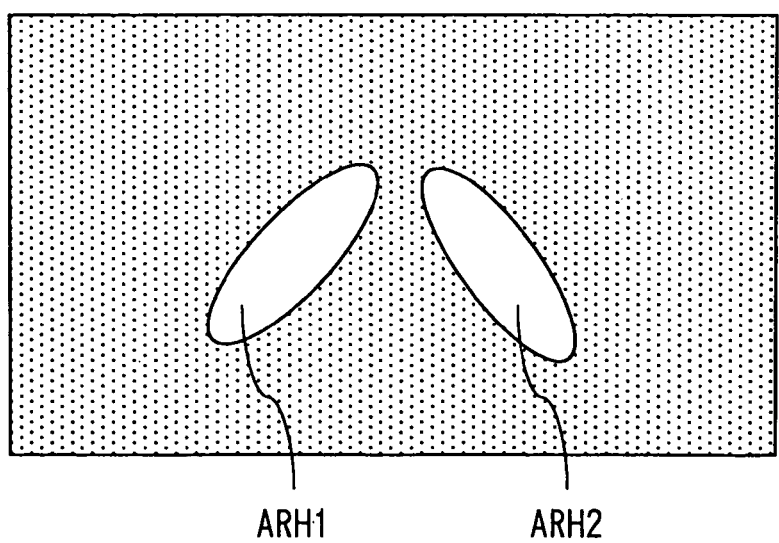
FIG. 14B is a diagram showing high luminance areas and of a digitized picture.

It is assumed here a process to detect the degree of reflection by the surface of a road from a picture in a road to which light beams from headlights of the vehicle are radiated as shown in FIG. 14A to result in areas ARH1 and ARH2 shown in FIG. 14B each comprising pixels each having a high luminance value in this case, when the surface of the road is wet and humid, the size of each of the high luminance areas ARH1 and ARH2 is large. When the surface of the road is dry, on the other hand, the size of each of the high luminance areas ARH1 and ARH2 is small.

Thus, when the pixel count representing the number of pixels included in each of the high luminance areas ARH1 and ARH2 is more than the pixel count threshold value, a determination result can be obtained as a result indicating that the degree of reflection from the surface of the road is high or reflection from the surface of the road exists. It is to be noted that the first to sixth modifications described above can of course be applied to this embodiment.

First Modification

In this embodiment, the degree of reflection from the surface of a road is determined based on the size of an area having high luminance value, as described above. While the size of an area having high luminance value can be indicated by the number of pixels in the road as explained earlier, in this modification, an aspect ratio of the road is used to indicate the size of the road. That is, the degree of reflection from the surface of a road is determined based on the aspect ratio.

Figure 16A:
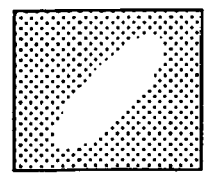
FIG. 16A is a diagram showing an area of a digitized picture having high luminance value.
Figure 16B:
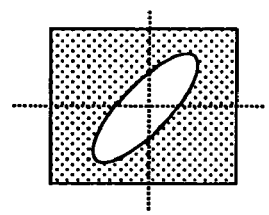
FIG. 16B is a diagram showing a gravity point of the area having high luminance value.
Figure 16C:
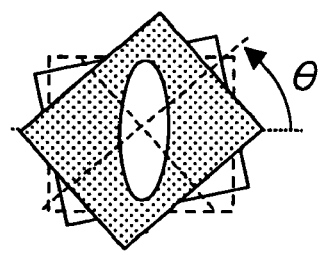
FIG. 16C is a diagram showing a typically rotated picture of the area having high luminance value.
Figure 16D:
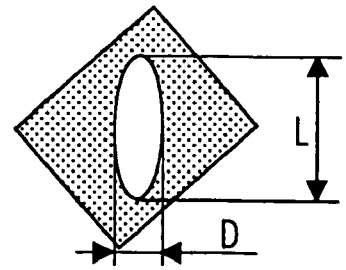
FIG. 16D is a diagram showing the aspect ratio of the area having high luminance value.

First, the road surface reflection computation unit 34 identifies horizontal and vertical pixel numbers (HN and VN) showing pixel positions each having a luminance value, at least equal to a threshold value from the picture of a road extracted by the picture extraction unit 32. As a result, a high luminance area of a digitized picture shown in FIG. 16A is recognized. Then, the position of the gravity point of this area having high luminance value is identified as shown in FIG. 16B. Subsequently, the area having high luminance value is rotated within a predetermined angular range such as ±90 degrees with the gravity point taken as the center of the rotation as shown in FIG. 16C. Finally, as shown in FIG. 16D, a maximum value of the aspect ratio (L/D) of the area having high luminance value is computed.

The determination unit 36 determines whether the maximum value of the aspect ratio of the area having high luminance value is more than an aspect ratio threshold value for aspect ratios, and supplies reflection gradient information to the headlight control unit 40. The reflection gradient information indicates the degree of reflection from the surface of the road based on a determination result.

Figure 17:
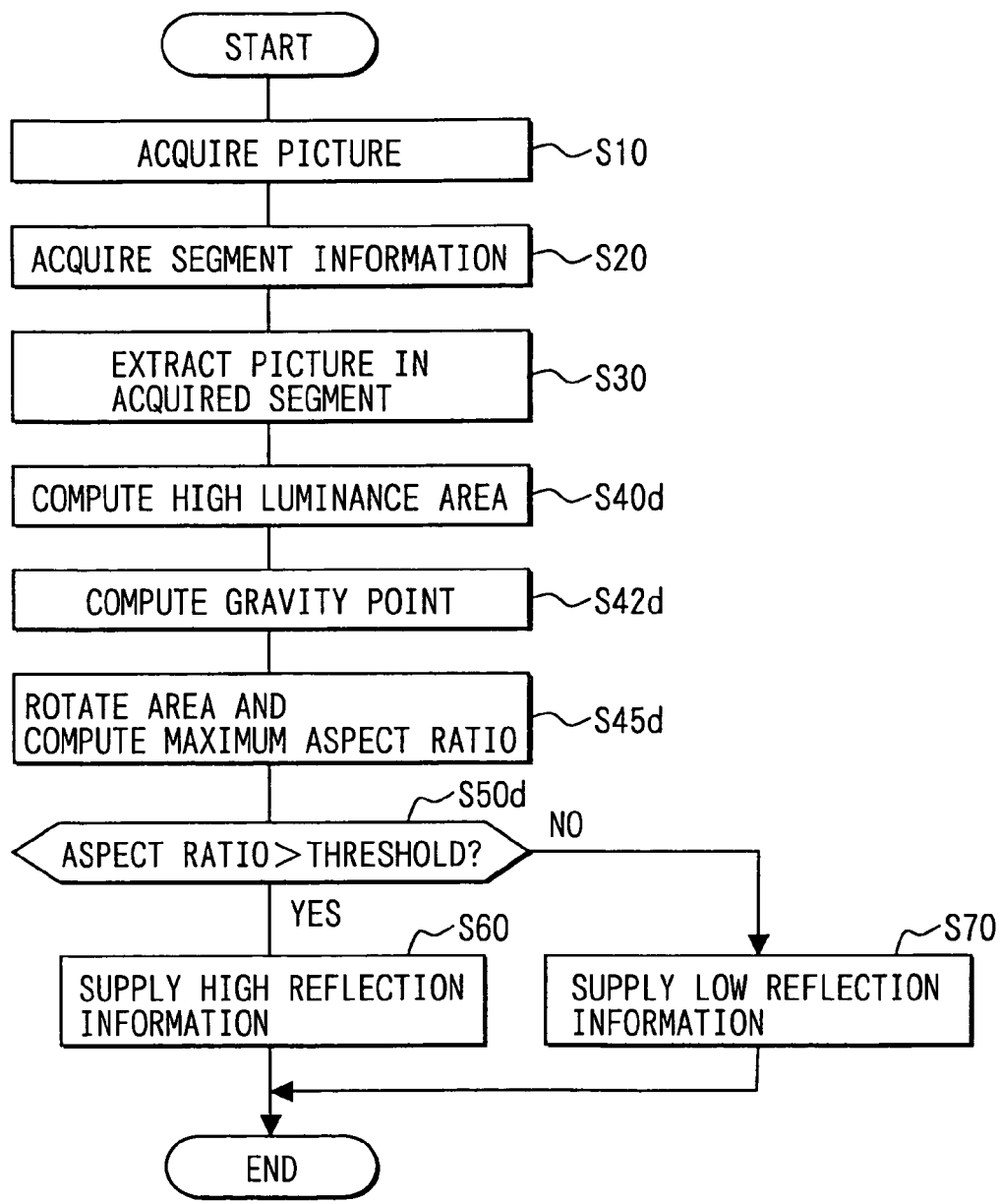
FIG. 17 shows a flowchart representing processing by the road surface reflection detection unit to determine the degree of reflection from the surface of a road based on the aspect ratio of an area having high luminance value in a modification of the fourth embodiment.

Next, by referring to a flowchart shown in FIG. 17, processing by the road surface reflection detection unit 30 in the road surface reflection detecting apparatus 100 is explained as a characteristic of this modification.

At step S40d, from the picture of the road extracted at step S30, an area having high luminance value is recognized. This area having high luminance value is an area comprising pixel positions indicated by horizontal/vertical pixel numbers HNs/VNs each showing a luminance value, at least equal to a threshold value, then, at step S42d, the gravity point of the area having high luminance value is located. Subsequently, at step S45d, the area having high luminance value is rotated with the center of the rotation fixed at the gravity point located at step S42d and a maximum value of the aspect ratio of the area having high luminance value is found.

At step S50d, the maximum value found at step S45d as the maximum value of the aspect ratio of the area having high luminance value is compared with the aspect ratio threshold value to determine whether the maximum value of the aspect ratio of the area having high luminance value is more than the aspect ratio threshold value. When the maximum value of the aspect ratio of the area having high luminance value is more than the aspect ratio threshold value, the processing proceeds to step S60. When the maximum value of the aspect ratio of the area having high luminance value is smaller than the aspect ratio threshold value, on the other hand, the processing proceeds to step S70.

At step S60, since the maximum value of the aspect ratio of the area having high luminance value is more than the aspect ratio threshold value reflection degree information showing a high degree of reflection from the surface of the road in the road, that is, reflection degree information indicating that reflection from the surface of the road exists, is generated and supplied to the headlight control unit 40.

At step S70, on the other hand, since the maximum value of the aspect ratio of the area having high luminance value is smaller than the aspect ratio threshold value reflection degree information showing a low degree of reflection from the surface of the road in the road, that is, reflection degree information indicating that no reflection from the surface of the road exists, is generated and supplied to the headlight control unit 40.

It is assumed here a process to detect the degree of reflection by the surface of a road from a picture in a road to which light beams from headlights of the vehicle are radiated. In this case, the high luminance area with its road surface reflecting a light beam has a vertically long shape as seen in the forward-movement direction of the vehicle. In the case of a wet and humid surface of a road, the high luminance area with its road surface reflecting a light beam has a more vertically long shape than a dry surface of a road, resulting in a larger aspect ratio. Thus, when the maximum value of the aspect ratio of the area having high luminance value is more than the aspect ratio threshold value reflection degree information showing a high degree of reflection from the surface of the road can be obtained as a result of determination.

Second Modification

Even if only one light source originates a reflected beam, in the case of a road surface with a high degree of unevenness, for example, the area having high luminance value may be divided into a plurality of sub-areas in some cases. In such cases, the size of an area having high luminance value may appear apparently as a small sub-area due to the effect of the unevenness of the surface road. As a result, the degree of reflection from the surface of the road cannot be determined with a high degree of accuracy.

Thus, in determination of an area size for a plurality of high luminance sub-areas described above, the road surface reflection computation unit 34 treats the sub-areas each having high luminance value, as one high luminance area comprising high luminance sub-areas having mutual-separation degrees smaller than a mutual-separation degree threshold value for mutual separation degrees. In the case of two sub-areas each having high luminance value for example, the road surface reflection computation unit 34 counts the number of pixels separated from each other by a shortest distance among pixels at locations composing the boundary between the sub-areas each having high luminance value in this way, the degree of reflection from the surface of the road can be determined with a high degree of accuracy even if the surface of the road has a high degree of unevenness.

Fifth Embodiment

In the road surface reflection detection unit 30 in the fourth embodiment, as described earlier, the road surface reflection computation unit 34 locates the position of each pixel having high luminance at least equal to a threshold value based on luminance value of pixels in a road, and computes a pixel count representing the number of pixels in a high luminance area comprising the located pixel positions. The determination unit 36 determines whether the pixel count computed by the road surface reflection computation unit 34 as the number of pixels in the area having high luminance value is more than a pixel count threshold value for pixel counts.

In the road surface reflection detection unit 30 in the fifth embodiment, on the other hand, the road surface reflection computation unit 34 locates the position of each pixel having high luminance at least equal to a threshold value based on luminance value of pixels in a road, and computes a fluctuation quantity representing the degree of smoothness of the boundary line of each high luminance area consisting of the located pixel positions. The determination unit 36 determines whether the fluctuation quantity computed by the road surface reflection computation unit 34 is more than a fluctuation quantity threshold value for fluctuation quantities.

Figure 18A:
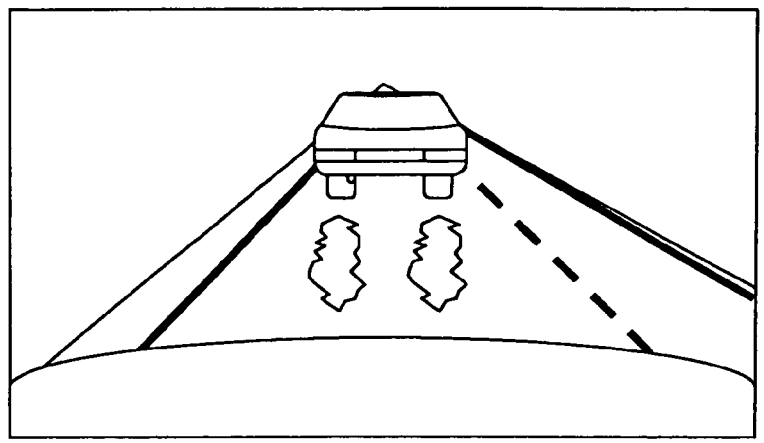
FIG. 18A is a diagram showing typical fluctuation shapes of roads caused by unevenness of a road surface.

That is, when the road surface of a road to which a light beam is radiated from a vehicle running immediately ahead of subject vehicle exhibits unevenness, the boundary line of each area having high luminance value is wobbly due to the unevenness of the road surface as shown in FIG. 18A for a wet and humid road surface. This embodiment determines the degree of reflection from the surface of a road based on the fluctuation quantity representing the degree of smoothness of the boundary line of each area having high luminance value.

Figure 18B:
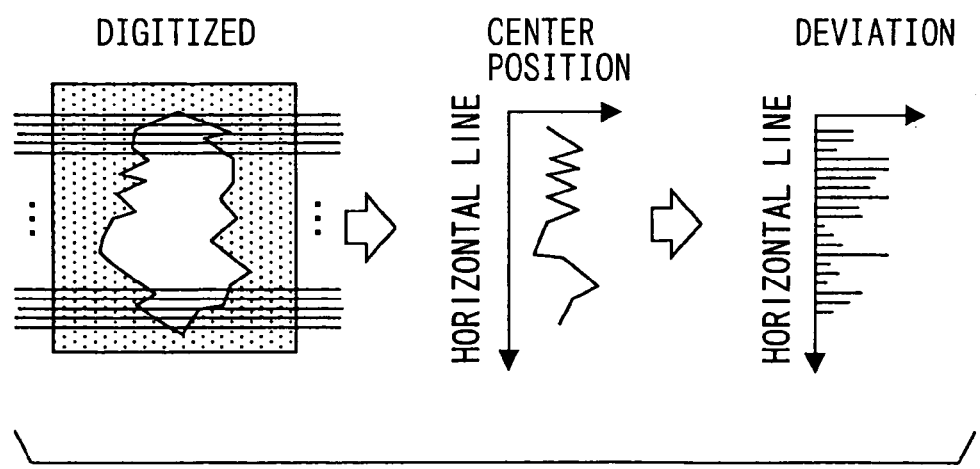
FIG. 18B is an explanatory diagram showing a procedure of computing a fluctuation quantity.

First, the road surface reflection computation unit 34 identifies horizontal and vertical pixel numbers (HN and VN) showing pixel positions each having a luminance value, at least equal to a threshold value from the picture of a road extracted by the picture extraction unit 32. As a result, for example, a high luminance area of a digitized picture shown in FIG. 18B is recognized. Then, the position of a pixel at a horizontal-direction center of each horizontal line in the area having high luminance value is found as shown in FIG. 18B.

Subsequently, a deviation (variation) magnitude of the position of a pixel at a horizontal-direction center of a particular horizontal line is found. The deviation magnitude is a deviation magnitude relative to the position of a pixel at a horizontal-direction center of a horizontal line having a horizontal pixel number HN greater than the particular horizontal line by a difference of 1. The horizontal line having a horizontal pixel number HN greater than the particular horizontal line by a difference of 1 is a horizontal line adjacent to the particular horizontal line. Finally, the sum of the computed deviation magnitudes is found as the fluctuation quantity.

The determination unit 36 determines whether the computed fluctuation quantity is more than the fluctuation quantity threshold value for fluctuation quantities, and supplies reflection gradient information to the headlight control unit 40. The reflection gradient information indicates the degree of reflection from the surface of the road based on a determination result.

Figure 19:
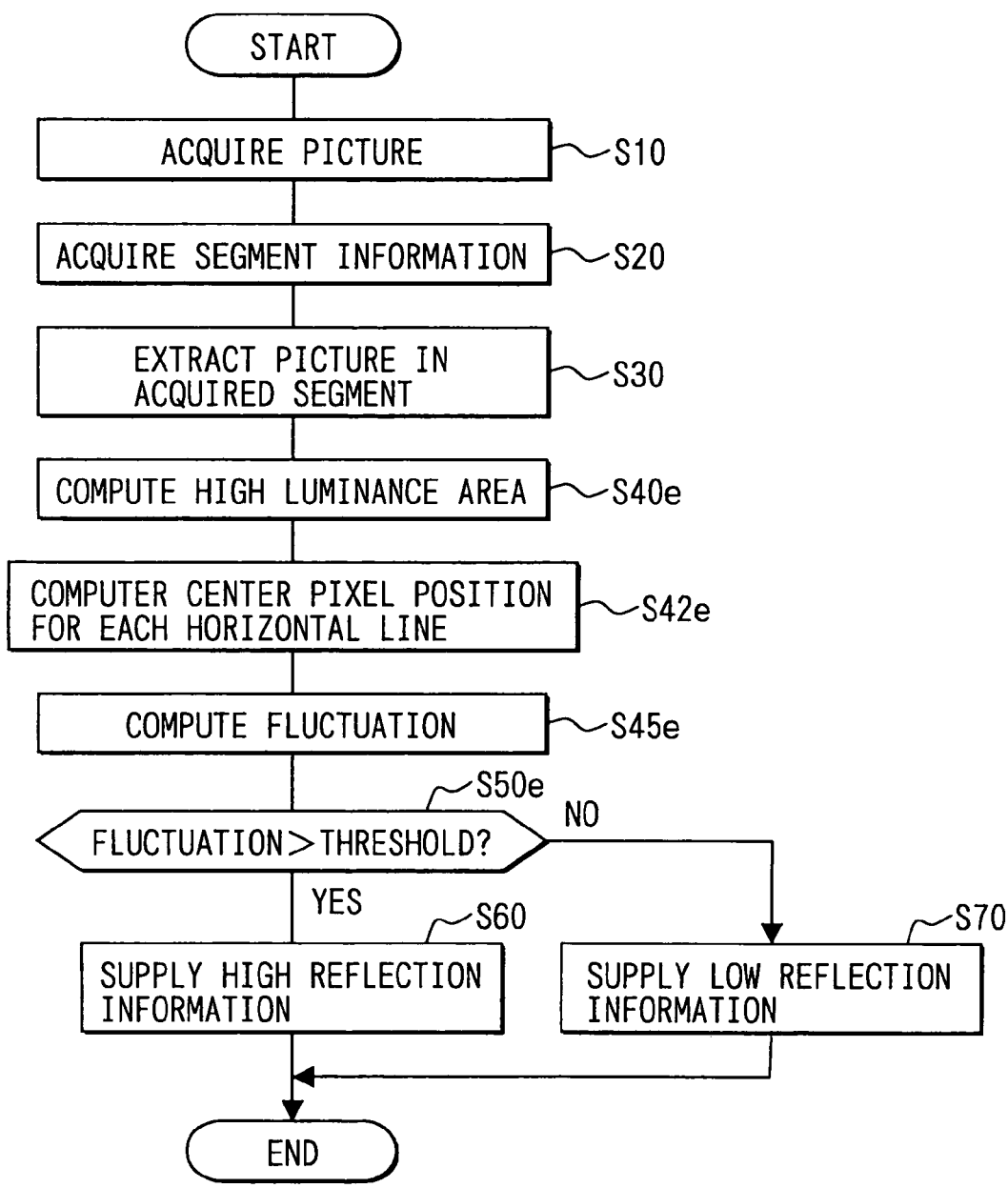
FIG. 19 shows a flowchart representing processing by the road surface reflection detection unit to determine the degree of reflection from the surface of a road based on a fluctuation quantity in a fifth embodiment.

Next, by referring to a flowchart shown in FIG. 19, processing by the road surface reflection detection unit 30 in the road surface reflection detecting apparatus 100 is explained as a characteristic of this embodiment.

At step S40e, from the picture of the road extracted at step S30, an area having high luminance value is recognized. This area having high luminance value is an area comprising pixel positions indicated by horizontal/vertical pixel numbers HNs/VNs each showing a luminance value, at least equal to a threshold value, then, at step S42e, the position of a pixel at a horizontal-direction center of each horizontal line in the area having high luminance value is found. Subsequently, at step S45e, a deviation magnitude between the positions of pixels at horizontal-direction centers of adjacent horizontal lines is found and a fluctuation quantity representing the sum of the deviation magnitudes is computed.

Then, at step S50e, the fluctuation quantity computed at step S45e is compared with the fluctuation quantity threshold value to determine whether the fluctuation quantity is more than the fluctuation quantity threshold value. When the fluctuation quantity is determined to be more than the fluctuation quantity threshold value, the processing proceeds to step S60. When the fluctuation quantity is determined to be smaller than the fluctuation quantity threshold value, on the other hand, the processing proceeds to step S70.

At step S60, since the fluctuation quantity is more than the fluctuation quantity threshold value reflection degree information showing a high degree of reflection from the surface of the road in the road, that is, reflection degree information indicating that reflection from the surface of the road exists, is generated and supplied to the headlight control unit 40.

At step S70, on the other hand, since the fluctuation quantity is smaller than the fluctuation quantity threshold value reflection degree information showing a low degree of reflection from the surface of the road in the road, that is, reflection degree information indicating that no reflection from the surface of the road exists, is generated and supplied to the headlight control unit 40.

In this way, the degree of reflection from the surface of a road can be determined based on the fluctuation quantity indicating the shape of an area having high luminance value. It is to be noted that the first to sixth modifications described above can of course be applied to this embodiment.

First Modification

In the second modification of the fourth embodiment, processing to cope with unevenness of a road surface is carried out. Instead of the effects of unevenness of a road surface, for example, there may be another effect caused by reflection of light beams from a plurality of light sources by the surface of a road. In this case, the road surface reflection computation unit 34 must deal with a plurality of areas each having high luminance value in such a case, the positions of driving lanes in the road are found based on the luminance value of each pixel on a picture extracted by the picture extraction unit 32.

Then, based on a high luminance area between the traffic lanes, the number of pixels in the area having high luminance value, the aspect ratio of the same area or the fluctuation quantity representing the degree of smoothness of the boundary line of the same area is computed. In this way, the degree of reflection from the surface of a road between the driving lanes can be determined.

It is to be noted that, when a plurality of high luminance areas between the driving lanes is to be dealt with, based on a high luminance area closest to the center line of the traffic lanes, the number of pixels in the area having high luminance value, the aspect ratio of the same area or the fluctuation quantity representing the degree of smoothness of the boundary line of the same area is computed.

Second Modification

Figure 20A:
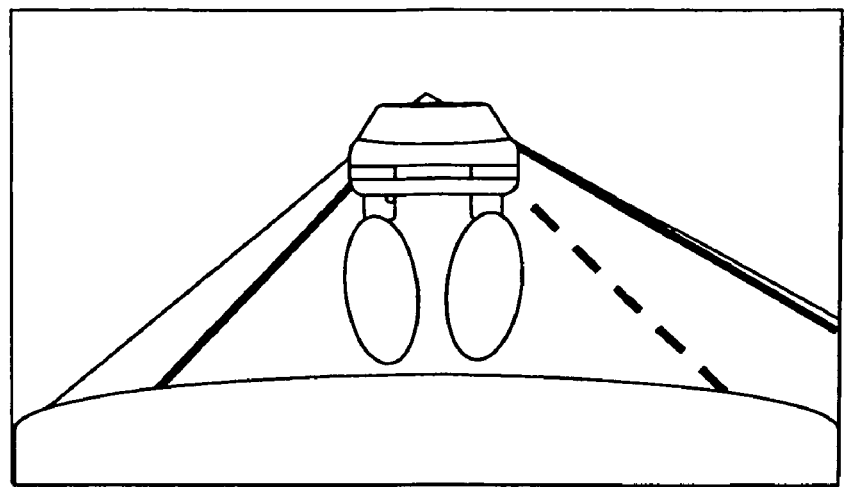
FIG. 20A is a diagram showing a case in which a picture of a road including an area having high luminance value.
Figure 20B:
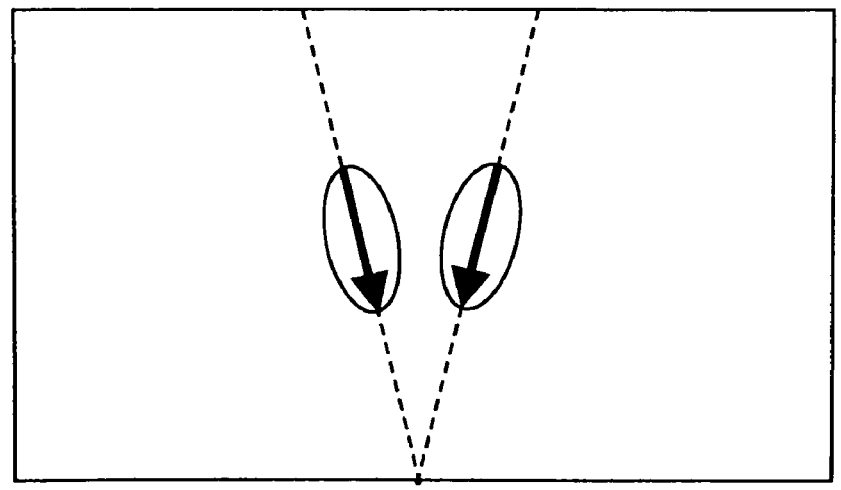
FIG. 20B is a diagram showing a case in which a direction of a long axis of the area having high luminance value is recognized.

It is assumed here that a picture of a road including an area having high luminance value, as shown in FIG. 20A is taken. In this case, the road surface reflection computation unit 34 recognizes the direction of the long axis of the area having high luminance value, as shown in FIG. 20B. When the recognized direction of the long axis of the area having high luminance value is different from the direction toward a light source of radiation from the vehicle, that is, the direction toward the head light of the vehicle, or different from the direction toward the camera 10, the area having high luminance value can be excluded from objects of computation.

In this way, a road line in a road having a direction different from the direction described above can be prevented from being mistakenly detected as an origin of reflection from the surface of the road. It is to be noted that, the direction of the long axis of the area having high luminance value can be identified by finding an angle resulting in a maximum aspect ratio by adoption of the aspect ratio computation method explained in the description of the modification.

Sixth Embodiment

Figure 21A:
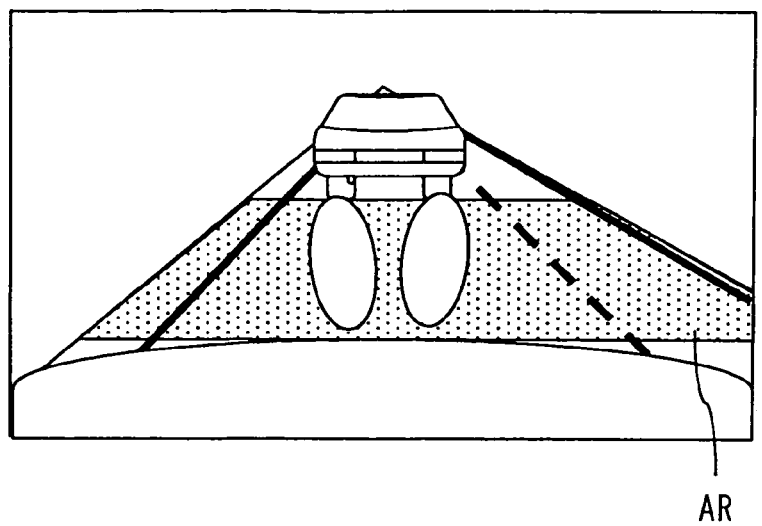
FIG. 21A is a diagram showing a road between subject vehicle and a preceding body (obstacle) such as a vehicle running immediately ahead of subject vehicle.

The road surface reflection detecting apparatus 100 implemented by the sixth embodiment has a milli-wave radar 60a (FIG. 5) for detecting a distance from subject vehicle to a preceding body such as a vehicle running immediately ahead of subject vehicle. The picture extraction unit 32 shown in the same figure extracts a road AR located between subject vehicle and the preceding body such as a vehicle running immediately ahead of subject vehicle as shown in FIG. 21A. The road surface reflection computation unit 34 computes a luminance derivative value between pixels in the horizontal line direction of the picture of the road extracted by the picture extraction unit 32 for each horizontal line, and computes a sum of the luminance derivative value found for all horizontal lines from luminance derivative value.

The determination unit 36 determines whether the sum computed by the road surface reflection computation unit 34 as the sum of the luminance derivative value is more than a luminance differential (derivative) value threshold value for luminance derivative value.

Figure 21B:
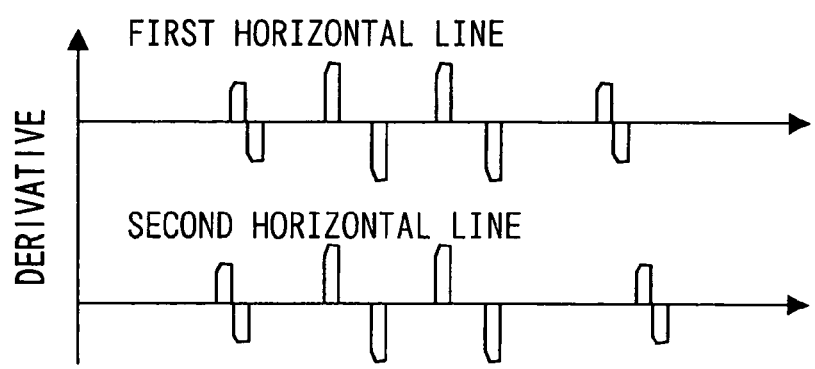
FIG. 21B is a diagram showing a case in which a luminance derivative value between pixels in the direction of a horizontal line is computed for each horizontal line.
Figure 21C:
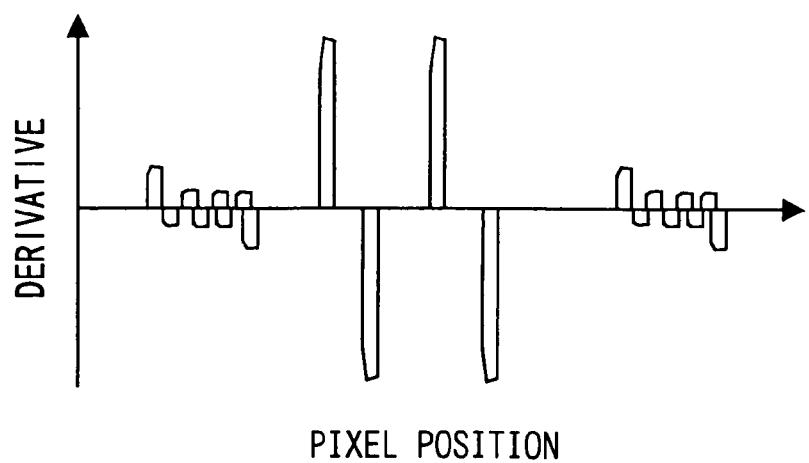
FIG. 21C is a diagram showing a case in which a sum of luminance derivative value of all horizontal lines in a road is computed from the luminance derivative value of the horizontal lines.

First, the road surface reflection computation unit 34 computes a luminance derivative value between pixels in the horizontal line direction for each horizontal line as shown in FIG. 21B on the basis luminance value of pixels in the picture of the road extracted by the picture extraction unit 32. Then, as shown in FIG. 21C, the road surface reflection computation unit 34 computes a sum of the luminance derivative value found for all horizontal lines from the luminance derivative value.

The determination unit 36 determines whether the sum computed by the road surface reflection computation unit 34 as the sum of the luminance derivative value is more than the luminance derivative threshold value, and supplies reflection gradient information to the headlight control unit 40. The reflection gradient information indicates the degree of reflection from the surface of the road based on a determination result.

Figure 22:
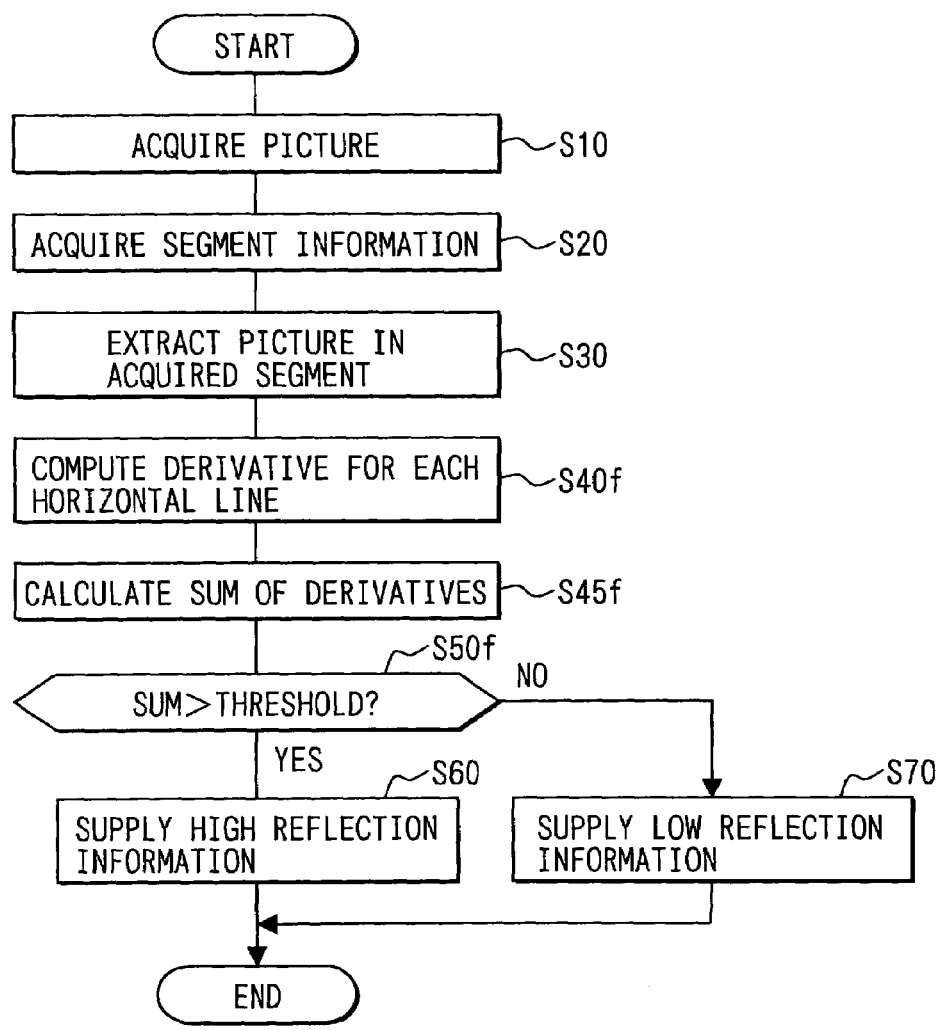
FIG. 22 shows a flowchart representing processing by the road surface reflection detection unit to determine the degree of reflection from the surface of a road based on a sum of luminance derivative value in a sixth embodiment.

Next, by referring to a flowchart shown in FIG. 22, processing by the road surface reflection detection unit 30 in the road surface reflection detecting apparatus 100 is explained as a characteristic of this embodiment.

At step S40f, the road surface reflection computation unit 34 computes a luminance derivative value between pixels in the horizontal line direction for each horizontal line from luminance value of pixels in the picture of the road extracted at step S30. Then, at step S45f, the road surface reflection computation unit 34 computes a sum of the luminance derivative value found for all horizontal lines from the luminance derivative value.

Subsequently, at step S50f, the sum computed at step S45f as the sum of the luminance derivative value is compared with the luminance derivative threshold value to determine whether the sum of the luminance derivative value is more than the luminance derivative value threshold value. When the sum of the luminance derivative value is determined to be more than the luminance derivative value threshold value, the processing proceeds to step S60. When the sum of the luminance derivative value is determined to be smaller than the luminance derivative value threshold value, on the other hand, the processing proceeds to step S70.

At step S60, since the sum of the luminance derivative value is more than the luminance derivative value threshold value reflection degree information showing a high degree of reflection from the road surface of the road, that is, reflection degree information indicating that reflection from the surface of the road exists, is generated and supplied to the headlight control unit 40.

At step S70, on the other hand, since the sum of the luminance derivative value is smaller than the luminance derivative value threshold value reflection degree information showing a low degree of reflection from the road surface of the raveled road, that is, reflection degree information indicating that no reflection from the surface of the road exists, is generated and supplied to the headlight control unit 40.

That is, in many cases, a radiated light beam originated from a brake lamp or vehicle-width lamp provided on the rear portion of a vehicle running immediately ahead of subject vehicle propagates in a perpendicular direction inside a picture taken by the camera 10. Thus, by computing a luminance derivative value between pixels in the horizontal line direction for each horizontal line of the picture, a large luminance derivative value can be obtained due to an effect of pixel positions corresponding to a boundary of the radiated light beam. As a result, by computing a sum of the luminance derivative value found for all horizontal lines, a large sum of the luminance derivative value is also obtained due to the effect of pixel positions corresponding to a boundary of the radiated light beam.

Thus, when the sum of the luminance derivative value is more than the luminance derivative value threshold value, an outcome of determination can be obtained as a result indicating that the degree of reflection from the surface of a road due to a light source provided on a vehicle running immediately ahead is high. It is to be noted that the first to sixth modifications described above can of course be applied to this embodiment.

First Modification

The determination unit 36 in the road surface reflection detection unit 30 provided by each of the first to sixth embodiments determines the degree of reflection from the surface of a road by using only one threshold value. However, the degree of reflection from the surface of a road can also be determined in more detail by using a plurality of threshold value.

That is, when the surface of a road is in a wet and humid, ice-covered or snowy state, the surface of the road is shiny even though the degree of reflection from the surface of the road is dependent on various states of the road surface. Thus, by setting a plurality of threshold value for a variety of road surface states in advance, the degree of reflection from the surface of the road can also be determined in more detail.

Second Modification

A plurality of road surface reflection detection units 30 is provided in each of the first to sixth embodiments and a weight is applied to each of degrees of reflection from the surface of a road. As described earlier, the degrees of reflection from the surface of a road are each obtained as a detection result output by the road surface reflection detection units 30. Then, a sum of the weighted results of detection can be found as a final result of detection.

That is, the degree of reflection from the surface of a road can also be determined finally from a result of determining reflection from the surface of the road based on a result of determination using at least 2 threshold value selected among the luminance threshold value for the first embodiment, the luminance gradient threshold value for the second embodiment, the luminance gradient count threshold value for the third embodiment, the pixel count threshold value for the fourth embodiment, the fluctuation quantity threshold value for the fifth embodiment and the luminance derivative threshold value for the sixth embodiment. Thus, a more accurate degree of reflection from the surface of a road can be detected.

Third Modification

A final degree of reflection from the surface of a road can be detected by considering changes observed with the lapse of time as changes in detection result produced by the road surface reflection detection unit 30 provided in any of the first to sixth embodiments and considering detection results obtained at different times as results of detecting the degree of reflection from the surface of the road.

Thus, since a hysteresis characteristic can be brought about to a result of detecting the degree of reflection from the surface of a road, even if the state of the road surface changes much, the result of detecting the degree of reflection from the surface of the road can be prevented from varying much.

The present invention should not be limited to the above embodiments and modifications, but may be implemented in many other ways without departing from the spirit of the invention.

What is claimed is:

1. A road surface reflection detecting apparatus comprising:
   a picture-taking means for taking a first picture including a road in front of a vehicle;
   a road recognition means for recognizing a road in the first picture taken by the picture-taking means by identifying horizontal pixel numbers representing a location of pixels serving as horizontal line boundaries of the road and identifying vertical pixel numbers representing a location of pixels serving as vertical line boundaries of the road;
   a picture extraction means for extracting from the first picture taken by the picture-taking means a second picture based on the identified horizontal and vertical pixel numbers, the second picture being only a picture in the road recognized by the road recognition means; and
   a road surface reflection detection means for detecting a degree of reflection from the surface of a road in the road from the second picture extracted by the picture extraction means.

2. The road surface reflection detecting apparatus according to claim 1, wherein the road surface reflection detection means includes:
   a road surface reflection computation means for computing an average luminance value in the road from luminance value of pixels in the second picture extracted by the picture extraction means; and
   a determination means for determining whether the average luminance value computed by the road surface reflection computation means is more than a threshold value for the average luminance value, wherein the road surface reflection detection means outputs a determination result indicating that the degree of reflection from the surface of the road is high, when the determination means determines that the average luminance value is more than the threshold value.

3. The road surface reflection detecting apparatus according to claim 1, wherein the road surface reflection detection means includes:
   a road surface reflection computation means for computing a luminance gradient representing a rate of change in luminance value of each pixel in the direction of a horizontal line in the second picture extracted by the picture extraction means and computing an average luminance gradient for the entire picture from the computed luminance gradients; and
   a determination means for determining whether the average luminance gradient computed by the road surface reflection computation means is more than a threshold value for the average luminance gradient, wherein the road surface reflection detection means outputs a determination result indicating that the degree of reflection from the surface of the road is high, when the determination means determines that the average luminance gradient is more than the threshold value.

4. The road surface reflection detecting apparatus according to claim 1, wherein the road surface reflection detection means includes:
   a road surface reflection computation means for computing a luminance gradient representing a rate of change in luminance value of each pixel in the direction of a horizontal line in the second picture extracted by the picture extraction means and computing a luminance gradient count representing the number of aforementioned computed luminance gradients; and
   a determination means for determining whether the luminance gradient count computed by the road surface reflection computation means is more than a threshold value for the luminance gradient count, wherein the road surface reflection detection means outputs a determination result indicating that the degree of reflection from the surface of the road is high, when the determination means determines that the luminance gradient count is more than a threshold value for the luminance gradient count.

5. The road surface reflection detecting apparatus according to claim 1, wherein the road surface reflection detection means includes:
   a road surface reflection computation means for locating, based on luminance value of pixels in the second picture extracted by the picture extraction means, pixel positions each having a high luminance of more than a threshold value and computing a size of a high luminance area comprising the located pixel positions; and
   a determination means for determining whether the area size of the high luminance area computed by the road surface reflection computation means is more than a threshold value for the size of the high luminance area, wherein the road surface reflection detection means determines the degree of reflection from the surface of the road based on a determination result output by the determination means.

6. The road surface reflection detecting apparatus according to claim 5, wherein: the road surface reflection computation means computes the number of pixels included in the high luminance area as the size of the high luminance area; the determination means determines whether the number of pixels included in the high luminance area is more than a pixel count threshold value; and the road surface reflection detection means outputs a determination result indicating that the degree of reflection from the surface of the road is high, when the determination means determines that the number of pixels included in the high luminance area is more than the pixel count threshold value.

7. The road surface reflection detecting apparatus according to claim 5, wherein: the road surface reflection computation means computes an aspect ratio of the high luminance area as the size of the high luminance area; the determination means determines whether the aspect ratio of the high luminance area is more than a threshold value for the aspect ratio; and the road surface reflection detection means outputs a determination result indicating that the degree of reflection from the surface of the road is high, when the determination means determines that the aspect ratio of the high luminance area is more than threshold value for the aspect ratio.

8. The road surface reflection detecting apparatus according to claim 1, wherein the road surface reflection detection means includes:
 a road surface reflection computation means for locating, based on luminance value of pixels in the second picture extracted by the picture extraction means, pixel positions each having a high luminance at least equal to a threshold value and computing a fluctuation quantity representing the degree of smoothness of the boundary line enclosing a high luminance area comprising the located pixel positions; and
 a determination means for determining whether the fluctuation quantity representing the degree of smoothness of the boundary line enclosing the high luminance area is more than a threshold value for the fluctuation quantity, wherein the road surface reflection detection means outputs a determination result indicating that the degree of reflection from the surface of the road is high, when the determination means determines that the fluctuation quantity representing the degree of smoothness of the boundary line enclosing the high luminance area is more than the threshold value for the fluctuation quantity.

9. The road surface reflection detecting apparatus according to any one of claims 2 to 8, wherein the road surface reflection computation means locates at least one of the positions of pixels in one of driving lane marks including a traffic lane inside the road and the positions of pixels in road paint based on luminance value of pixels in the second picture extracted by the picture extraction means, and excludes at least one of the luminance value of the located positions of pixels, luminance gradients existing at the located positions of pixels, and the high luminance area from computation.

10. The road surface reflection detecting apparatus according to any one of claims 5 to 8, wherein, in case a plurality of the high luminance areas exists, the road surface reflection computation means computes degrees of separation between the high luminance areas, and determines the degree of reflection from the surface of a road by treating a plurality of high luminance areas each having a degree of separation not exceeding a threshold value for the degree of separation as one high luminance area.

11. The road surface reflection detecting apparatus according to any one of claims 5 to 8, wherein, in case a plurality of high luminance areas exists, the road surface reflection computation means locates the positions of driving lanes in the road based on luminance value of pixels in the picture extracted by the picture extraction means, and computes the size of a high luminance area existing between the located positions of the traffic lanes or a fluctuation quantity representing the degree of smoothness of a boundary line enclosing the high luminance area.

12. The road surface reflection detecting apparatus according to claim 11, wherein, in case a plurality of high luminance areas exists between the located traffic lanes, the road surface reflection computation means computes the size of a high luminance area closest to the center line of the traffic lanes or a fluctuation quantity representing the degree of smoothness of a boundary line enclosing the high luminance area.

13. The road surface reflection detecting apparatus according to any one of claims 5 to 8, wherein the road surface reflection computation means finds the direction of the long axis of the high luminance area and, when the direction of the long axis of the high luminance area is different from a direction toward a light source of the vehicle or a direction toward the picture-taking means, excludes the high luminance area from computation.

14. The road surface reflection detecting apparatus according to claim 1, further comprising:
 a body detection means for detecting a body existing in front of the vehicle, wherein the picture extraction means extracts the second picture in a road located between the vehicle and the body existing in front of the vehicle in case the body detection means detects the body.

15. The road surface reflection detecting apparatus according to claim 1, further comprising:
 a body detection means for detecting a body, which exists in front of the vehicle and includes a vehicle running immediately ahead of the vehicle, wherein the picture extraction means extracts the second picture in a road located between the vehicle and the body, which exists in front of the vehicle and is the vehicle running immediately ahead of the vehicle in case the body detection means detects the body; wherein the road surface reflection detection means includes:
 a road surface reflection computation means for computing luminance derivative value between pixels in a horizontal direction of the second picture from luminance value of pixels in the second picture extracted by the picture extraction means and computing a sum of the computed luminance derivative value for the entire picture from the luminance derivative value, and
 a determination means for determining whether the sum of the luminance derivative value computed by the road surface reflection computation means is more than a threshold value for the sum of the luminance derivative value, and wherein the road surface reflection detection means outputs a determination result indicating that the degree of reflection from the surface of the road is high, when the determination means determines that the sum of the luminance derivative value is more than a threshold value for the sum of the luminance derivative value.

16. The road surface reflection detecting apparatus according to claim 14 or 15, wherein the body detection means detects the body, which exists in front of the vehicle and includes a vehicle running immediately ahead of the vehicle, by using at least the picture taken by the picture-taking means of a picture output by a radar.

17. The road surface reflection detecting apparatus according to claim 1, wherein: the road surface reflection detection means includes a plurality of road surface reflection computation means which computes respective degrees of reflection from the surface of the road in a different manner from one another; and wherein the road surface reflection detection means determines a final degree of reflection from the surface of the road based on at least two of computed degrees of reflection from the surface of the road.

18. The road surface reflection detecting apparatus, according to claim 17, wherein the determination means includes a plurality of threshold value, as a criterion threshold value, and outputs a result of determination based on the criterion threshold value, and wherein the road surface reflection detection means determines the degree of reflection from the surface of the road based on a determination result by using the criterion threshold value.

19. The road surface reflection detecting apparatus according to claim 17, wherein the road surface reflection detection means determines a final degree of reflection from the surface of a road by at least considering changes observed with the lapse of time by detecting a degree of reflection from the road or considering detection results obtained at different times by detecting a degree of reflection from the surface of the road.

20. The road surface reflection detecting apparatus according to claim 1, further comprising:
a speed detection means for detecting a speed of the vehicle, wherein the picture extraction means has an extracted-range determination means for determining a range of a picture to be extracted based on a detection result produced by the speed detection means.

21. The road surface reflection detecting apparatus according to claim 1, further comprising:
a turn signal detection means for detecting a turn signal of the vehicle, wherein the picture extraction means has an extracted-range determination means for determining a range of the picture to be extracted based on a detection result by the turn signal detection means.

22. The road surface reflection detecting apparatus according to claim 1, further comprising:
a vehicle condition detection means for detecting one of vehicle conditions, which are a steering angle of a steering wheel in the vehicle and an angular speed around the vertical direction of the vehicle, wherein the picture extraction means has an extracted-range determination means for determining a range of the picture to be extracted based on a detection result produced by the vehicle condition detection means.

23. The road surface reflection detecting apparatus according to any one of claims 20 to 22, wherein the extracted-range determination means determines a range of the picture to be extracted based on at least two of the detection results by the speed detection means, the turn signal detection means and the vehicle condition detection means.

24. The road surface reflection detecting apparatus according to claim 1, further comprising:
a headlight control means for executing control of at least either directions of light beams radiated by headlights of the vehicle or light intensities of the light beams in accordance with a detection result by the road surface reflection detection means.

25. The road surface reflection detecting apparatus according to claim 1, further comprising:
an inter-vehicle distance control means for executing control of a distance between the vehicle and a vehicle running immediately ahead of the vehicle in accordance with a detection result by the road surface reflection detection means.

26. The road surface reflection detecting apparatus according to claim 1, wherein the road surface reflection detection means determines a plurality of high luminance areas based on the degree of reflection and computes one high luminance area, each of the plurality of the high luminance areas being separated from one another by less than a threshold value.

27. The road surface reflection detecting apparatus according to claim 1, wherein the road surface reflection detection means computes positions of driving lanes in the road based on the second picture extracted by the picture extraction means, and computes a size of a high luminance area existing within the computed position of the driving lane or a fluctuation quantity representing a degree of smoothness of a boundary line enclosing the high luminance area.

28. The road surface reflection detecting apparatus according to claim 1, wherein the road surface reflection detection means determines a high luminance area of higher luminance than a predetermined luminance, finds a direction of a longitudinal axis of the high luminance area, and excludes the high luminance area from being used in computation when the direction of the longitudinal axis of the high luminance area is different from a direction toward a light source of the vehicle or a direction toward the picture-taking means.

29. A road surface reflection detecting apparatus comprising:
a camera provided on a vehicle for taking a picture of a front area including a road in front of the vehicle and generating a picture signal of the front area;
a road recognition unit connected to the camera for recognizing only a road in the picture signal by identifying horizontal pixel numbers representing a location of pixels serving as horizontal line boundaries of the road and identifying vertical pixel numbers representing a location of pixels serving as vertical line boundaries of the road, wherein the road information is based on the identified horizontal and vertical pixel numbers and defines the road in the first picture signal;
a picture extraction unit connected to the camera for extracting a second picture, the second picture being only a picture in the road based on the road information produced by the road recognition unit; and
a road surface reflection detection unit for detecting a degree of reflection of light from a surface of the road from the second picture extracted by the picture extraction unit.

30. A road surface reflection detecting apparatus comprising
a picture-taking means for taking a first picture including a road in front of a vehicle;
a road recognition means for recognizing a road in the first picture taken by the picture-taking means by identifying horizontal pixel numbers representing a location of pixels serving as horizontal line boundaries of the road and identifying vertical pixel numbers representing a location of pixels serving as vertical line boundaries of the road;
a picture extraction means for extracting a second picture of only the road recognized by the road recognition means based on the identified horizontal and vertical pixel numbers; and
a road surface reflection detection means for detecting a degree of reflection from the surface of a road in the road from the second picture extracted by the picture extraction means.

31. A road surface reflection detecting apparatus comprising:
a picture-taking means for taking a first picture including a road in front of a vehicle;
a road recognition means for recognizing a road in the first picture taken by the picture-taking means by identifying horizontal pixel numbers representing a location of pixels serving as horizontal line boundaries of the road and identifying vertical pixel numbers representing a location of pixels serving as vertical line boundaries of the road;

a picture extraction means for extracting a second picture based on the identified horizontal and vertical pixel numbers, the second picture being only a picture in the road recognized by the road recognition means; and a road surface reflection detection means for detecting a degree of reflection from the surface of a road from the second picture extracted by the picture extraction means, wherein the road surface reflection detection means includes:

a road surface reflection computations means for (1) locating pixel positions each having a high luminance of more than a first threshold value indicative of a predetermined luminance of a pixel based on luminance values of pixels in the second picture extracted by the picture extraction means and (2) computing a size of a high luminance area including the located pixel positions, the high luminance area including a plurality of high luminance areas each having a degree of separation not exceeding a second threshold value indicative of a predetermined degree of separation between the high luminance areas in case the high luminance areas exist at a plurality of positions; and a determination means for determining whether an area size of the high luminance area is more than a third threshold value indicative of a predetermined size of the high luminance area, wherein the road surface reflection detection means determines the degree of reflection from the surface of the road based on a determination result output by the determination means.

32. A road surface reflection detecting apparatus comprising:

a picture-taking means for taking a first picture including a road in front of a vehicle;

a road recognition means for recognizing a road in the first picture taken by the picture-taking means by identifying horizontal pixel numbers representing a location of pixels serving as horizontal line boundaries of the road and identifying vertical pixel numbers representing a location of pixels serving as vertical line boundaries of the road;

a picture extraction means for extracting a second picture based on the identified horizontal and vertical pixel numbers, the second picture being only a picture in the road recognized by the road recognition means; and a road surface reflection detection means for detecting a degree of reflection from the surface of a road in the road from the second picture extracted by the picture extraction means, wherein the road surface reflection detection means includes:

a road surface reflection computation means for (1) locating, based on luminance value of pixels in the second picture extracted by the picture extraction means, pixel positions each having a high luminance of more than a first threshold value indicative of a predetermined luminance of a pixel, (2) computing a size of a high luminance area including the located pixel positions, (3) computing degrees of separation between the high luminance areas in case a plurality of the high luminance areas exist, (4) treating a plurality of the high luminance areas each having a degree of separation not exceeding a second threshold value indicative of a predetermined degree of separation as one high luminance area, (5) computing a fluctuation quantity representing a degree of smoothness of a boundary line enclosing the one high luminance area in case the one luminance area exists at a plurality of positions; and a determination means for determining whether the fluctuation quantity representing the degree of smoothness of the boundary line is more than a third threshold value indicative of a predetermined fluctuation quantity, wherein the road surface reflection detection means outputs a determination result indicating that the degree of reflection from the surface of the road is high, when the determination means determines that the fluctuation quantity representing the degree of smoothness of the boundary line enclosing the high luminance area is more than the third threshold value.

33. A road surface reflection detecting apparatus comprising:

a picture-taking means for taking a first picture including a road in front of a vehicle;

a road recognition means for recognizing a road in the first picture taken by the picture-taking means by identifying horizontal pixel numbers representing a location of pixels serving as horizontal line boundaries of the road and identifying vertical pixel numbers representing a location of pixels serving as vertical line boundaries of the road;

a picture extraction means for extracting a second picture based on the identified horizontal and vertical pixel numbers, the second picture being only a picture in the road recognized by the road recognition means; and a road surface reflection detection means for detecting a degree of reflection from the surface of a road in the road from the second picture extracted by the picture extraction means, wherein the road surface reflection detection means includes:

a road surface reflection computation means for (1) locating, based on luminance value of pixels in the second picture extracted by the picture extraction means, pixel positions each having a high luminance of more than a first threshold value indicative of a predetermined luminance of a pixel, (2) computing a size of a high luminance area including the located pixel positions, the high luminance area existing in a traffic lane in the road, which is determined based on the luminance value of each pixel in the second picture extracted by the picture extraction means, in case the high luminance areas exists at a plurality of positions in the road; and a determination means for determining whether an area size of the high luminance area is more than a second threshold value indicative of a predetermined size of high luminance area, and wherein the road surface reflection detection means determines the degree of reflection from the surface of the road based on a determination result output by the determination means.

34. A road surface reflection detecting apparatus comprising:

a picture-taking means for taking a first picture including a road in front of a vehicle;

a road recognition means for recognizing a road in the first picture taken by the picture-taking means by identifying horizontal pixel numbers representing a location of pixels serving as horizontal line boundaries of the road and identifying vertical pixel numbers representing a location of pixels serving as vertical line boundaries of the road;

a picture extraction means for extracting a second picture based on the identified horizontal and vertical pixel numbers, the second picture being only a picture in the road recognized by the road recognition means; and a road surface reflection detection means for detecting a degree of reflection from the surface of a road in the road from the second picture extracted by the picture extraction means, wherein the road surface reflection detection means includes:

a road surface reflection computation means for (1) locating, based on luminance value of pixels in the second picture extracted by the picture extraction means, pixel positions each having a high luminance of more than a first threshold value indicative of a predetermined luminance of a pixel, (2) computing a fluctuation quantity representing a degree of smoothness of a boundary line enclosing a high luminance area including the located pixel positions in case the one luminance area exists at a plurality of locations, the fluctuation quantity being with respect to one of a plurality of high luminance areas existing at a position closest to a center position of a traffic lane in the road in case the high luminance area exists at a plurality of positions inside the traffic lane, and a determination means for determining whether the fluctuation quantity representing the degree of smoothness of the boundary line is more than a second threshold value indicative of a predetermined fluctuation quantity, wherein the road surface reflection detection means outputs a determination result indicating that the degree of reflection from the surface of the road is high, when the determination means determines that the fluctuation quantity is more than the second threshold value.

35. A road surface reflection detecting apparatus comprising:

a picture-taking means for taking a first picture including a road in front of a vehicle;

a road recognition means for recognizing a road in the first picture taken by the picture-taking means;

a picture extraction means for extracting from the first picture taken by the picture-taking means a second picture, the second picture being only a picture in the road recognized by the road recognition means; and a road surface reflection detection means for detecting a degree of reflection from the surface of a road in the road from the second picture extracted by the picture extraction means, wherein the road surface reflection detection means includes:

a road surface reflection computation means for locating, based on luminance value of pixels in the second picture extracted by the picture extraction means, pixel positions each having a high luminance at least equal to a threshold value and computing a fluctuation quantity representing the degree of smoothness of the boundary line enclosing a high luminance area comprising the located pixel positions, the fluctuation quantity being a summation of deviation magnitudes of positions of pixels at a horizontal-direction center of corresponding horizontal lines; and a determination means for determining whether the fluctuation quantity representing the degree of smoothness of the boundary line enclosing the high luminance area is more than a threshold value for the fluctuation quantity, wherein the road surface reflection detection means outputs a determination result indicating that the degree of reflection from the surface of the road is high, when the determination means determines that the fluctuation quantity representing the degree of smoothness of the boundary line enclosing the high luminance area is more than the threshold value for the fluctuation quantity.

36. A road surface reflection detecting apparatus comprising:

a picture-taking means for taking a first picture including a road in front of a vehicle;

a road recognition means for recognizing a road in the first picture taken by the picture-taking means;

a picture extraction means for extracting from the first picture taken by the picture-taking means a second picture, the second picture being only a picture in the road recognized by the road recognition means; and a road surface reflection detection means for detecting a degree of reflection from the surface of a road in the road from the second picture extracted by the picture extraction means, wherein the road surface reflection detection means includes:

a road surface reflection computation means for locating, based on luminance value of pixels in the second picture extracted by the picture extraction means, pixel positions each having a high luminance of more than a threshold value and computing a size of a high luminance area comprising the located pixel positions; and a determination means for determining whether the area size of the high luminance area computed by the road surface reflection computation means is more than a threshold value for the size of the high luminance area, wherein the road surface reflection detection means determines the degree of reflection from the surface of the road based on a determination result output by the determination means, wherein, in case a plurality of the high luminance areas exists, the road surface reflection computation means computes degrees of separation between the high luminance areas, and determines the degree of reflection from the surface of a road by treating a plurality of high luminance areas each having a degree of separation not exceeding a threshold value for the degree of separation as one high luminance area.

37. A road surface reflection detecting apparatus comprising:

a picture-taking means for taking a first picture including a road in front of a vehicle;

a road recognition means for recognizing a road in the first picture taken by the picture-taking means;

a picture extraction means for extracting from the first picture taken by the picture-taking means a second picture, the second picture being only a picture in the road recognized by the road recognition means; and a road surface reflection detection means for detecting a degree of reflection from the surface of a road in the road from the second picture extracted by the picture extraction means, wherein the road surface reflection detection means includes:

a road surface reflection computation means for locating, based on luminance value of pixels in the second picture extracted by the picture extraction means, pixel positions each having a high luminance of more than a threshold value and computing a size of a high luminance area comprising the located pixel positions; and a determination means for determining whether the area size of the high luminance area computed by the road surface reflection computation means is more than a threshold value for the size of the high luminance area, wherein the road surface reflection detection means determines the degree of reflection from the surface of the road based on a determination result output by the determination means, wherein in case a plurality of high luminance areas exists, the road surface reflection computation means locates the positions of driving lanes in the road based on luminance value of pixels in the second picture extracted by the picture extraction means, and computes the size of a high luminance area existing between the located positions of the traffic lanes or a fluctuation quantity representing the degree of smoothness of a boundary line enclosing the high luminance area, wherein in case a plurality of high luminance areas exists between the located traffic lanes, the road surface reflection computation means computes the size of a high luminance area closest to the center line of the traffic lanes or a fluctuation quantity representing the degree of smoothness of a boundary line enclosing the high luminance area, the fluctuation quantity being a summation of deviation magnitudes of positions of pixels at a horizontal-direction center of corresponding horizontal lines.

* * * * *